US006956300B2

(12) United States Patent
Gizara

(10) Patent No.: US 6,956,300 B2
(45) Date of Patent: Oct. 18, 2005

(54) GIMBAL-MOUNTED HYDROELECTRIC TURBINE

(76) Inventor: Andrew Roman Gizara, 24471 Corta Cresta Dr., Lake Forest, CA (US) 92630-3914

( * ) Notice: Subject to any disclaimer, the term of this patent is extended or adjusted under 35 U.S.C. 154(b) by 149 days.

(21) Appl. No.: 10/604,601

(22) Filed: Aug. 4, 2003

(65) Prior Publication Data

US 2005/0029817 A1 Feb. 10, 2005

(51) Int. Cl.[7] .......................... F03B 13/10; F03B 13/12; H02P 9/04; F03C 5/02
(52) U.S. Cl. ............................ 290/43; 290/42; 290/44; 290/53; 290/54; 290/55; 60/398
(58) Field of Search ..................... 290/42–44, 53–55; 60/398

(56) References Cited

U.S. PATENT DOCUMENTS

| | | | | |
|---|---|---|---|---|
| 3,455,159 A | * | 7/1969 | Gies, Sr. ................. | 73/170.16 |
| 3,644,052 A | * | 2/1972 | Lininger ...................... | 415/7 |
| 3,687,567 A | * | 8/1972 | Lininger ...................... | 415/7 |
| 3,818,703 A | * | 6/1974 | Lapeyre ...................... | 60/504 |
| 3,818,704 A | * | 6/1974 | Lapeyre ...................... | 60/504 |
| 3,980,894 A | * | 9/1976 | Vary et al. .................. | 290/54 |
| 4,034,231 A | * | 7/1977 | Conn et al. ................. | 290/53 |
| 4,039,847 A | * | 8/1977 | Diggs ........................... | 290/42 |
| 4,048,512 A | * | 9/1977 | Wood .......................... | 290/53 |
| 4,060,344 A | * | 11/1977 | Ootsu ......................... | 417/330 |
| 4,078,382 A | * | 3/1978 | Ricafranca et al. ........ | 60/398 |
| 4,151,424 A | * | 4/1979 | Bailey ......................... | 290/54 |
| 4,159,427 A | * | 6/1979 | Wiedemann ................ | 290/55 |
| 4,170,738 A | * | 10/1979 | Smith .......................... | 290/42 |
| 4,172,689 A | * | 10/1979 | Thorsheim ................... | 415/7 |
| 4,216,655 A | * | 8/1980 | Ghesquiere ................. | 60/398 |
| 4,256,970 A | * | 3/1981 | Tomassini ................... | 290/53 |
| 4,258,270 A | * | 3/1981 | Tornkvist .................... | 290/53 |
| 4,266,403 A | * | 5/1981 | Hirbod ........................ | 60/698 |
| 4,313,059 A | * | 1/1982 | Howard ....................... | 290/54 |
| 4,327,296 A | * | 4/1982 | Weyers ........................ | 290/53 |
| 4,327,297 A | * | 4/1982 | Harrison ..................... | 290/53 |
| 4,335,319 A | * | 6/1982 | Mettersheimer, Jr. ...... | 290/54 |
| 4,352,023 A | * | 9/1982 | Sachs et al. ................ | 290/42 |
| 4,369,375 A | * | 1/1983 | Romano ...................... | 290/53 |

(Continued)

*Primary Examiner*—Darren Schuberg
*Assistant Examiner*—Pedro J. Cuevas

(57) ABSTRACT

A power plant extracts energy from a free flowing motive fluid by means of a turbine mounted on a gimbal. The shroud element of the fluid intake has external rudders, in conjunction with the gimbal mounting, enabling the enclosed turbine to instantaneously respond to changes in the direction of the free flowing motive fluid thus ensuring the face area of the intake is always physically orthogonal to the direction of the motive fluid streamlines. The shroud element may also be buoyant so as to optimally extract energy from an upper non-turbulent and higher velocity layer of the free flowing motive fluid. To function within an inherently unsteady source of energy, the preferred embodiment of the turbine is coupled to a DC generator which may further be coupled to a voltage and current regulating circuit which either charges a battery, performs electrolysis of water to produce hydrogen fuel, or is further coupled to a DC motor coupled to an AC generator. Alternatively an AC induction generator may be coupled to the turbine. Other mechanical, electrical, electronic, or electromechanical features may optionally be implemented to perform such tasks as adaptively locating the turbine in the maximum velocity flow, adapting internal vane and runner blade pitches for various flow rates and loads, keeping the intake free of obstructions, preventing loss of aquatic life, controlling and communicating the state of charge of the battery, or gauging and controlling the electrolysis process and communicating the fullness of the hydrogen gas output tanks.

9 Claims, 8 Drawing Sheets

U.S. PATENT DOCUMENTS

| | | | | |
|---|---|---|---|---|
| 4,384,212 A | * | 5/1983 | Lapeyre | 290/53 |
| 4,403,475 A | * | 9/1983 | Kondo | 60/398 |
| 4,443,708 A | * | 4/1984 | Lapeyre | 290/53 |
| 4,447,740 A | * | 5/1984 | Heck | 290/53 |
| 4,453,894 A | * | 6/1984 | Ferone et al. | 417/332 |
| 4,464,080 A | * | 8/1984 | Gorlov | 405/76 |
| 4,468,153 A | * | 8/1984 | Gutierrez Atencio | 405/78 |
| 4,480,966 A | * | 11/1984 | Smith | 417/332 |
| 4,490,232 A | * | 12/1984 | Lapeyre | 204/278 |
| 4,495,424 A | * | 1/1985 | Jost | 290/53 |
| 4,516,033 A | * | 5/1985 | Olson | 290/54 |
| 4,599,158 A | * | 7/1986 | Ofenloch | 204/229.5 |
| 4,622,471 A | * | 11/1986 | Schroeder | 290/42 |
| 4,625,124 A | * | 11/1986 | Ching-An | 290/42 |
| 4,661,716 A | * | 4/1987 | Chu | 290/53 |
| 4,816,697 A | * | 3/1989 | Takada | 290/54 |
| 4,843,249 A | * | 6/1989 | Bussiere | 290/53 |
| 4,850,190 A | * | 7/1989 | Pitts | 60/398 |
| 5,005,357 A | * | 4/1991 | Fox | 60/398 |
| 5,009,568 A | * | 4/1991 | Bell | 415/3.1 |
| 5,066,867 A | * | 11/1991 | Shim | 290/53 |
| 5,105,094 A | * | 4/1992 | Parker | 290/53 |
| 5,136,174 A | * | 8/1992 | Simoni | 290/54 |
| 5,468,132 A | * | 11/1995 | Snell et al. | 418/206.4 |
| 5,499,889 A | * | 3/1996 | Yim | 405/76 |
| 5,507,943 A | * | 4/1996 | Labrador | 210/136 |
| 5,664,418 A | * | 9/1997 | Walters | 60/398 |
| 6,184,590 B1 | * | 2/2001 | Lopez | 290/53 |
| 6,194,791 B1 | * | 2/2001 | Wells | 290/53 |
| 6,227,803 B1 | * | 5/2001 | Shim | 416/44 |
| 6,294,844 B1 | * | 9/2001 | Lagerwey | 290/55 |
| 6,327,994 B1 | * | 12/2001 | Labrador | 114/382 |
| 6,534,705 B2 | * | 3/2003 | Berrios et al. | 136/243 |
| 6,537,018 B2 | * | 3/2003 | Streetman | 415/3.1 |
| 6,551,053 B1 | * | 4/2003 | Schuetz | 415/3.1 |
| 6,559,552 B1 | * | 5/2003 | Ha | 290/54 |
| 6,568,878 B2 | * | 5/2003 | Woodall et al. | 405/25 |
| 6,734,576 B2 | * | 5/2004 | Pacheco | 290/55 |
| 6,831,373 B1 | * | 12/2004 | Beaston | 290/43 |
| 6,849,963 B2 | * | 2/2005 | Grinsted et al. | 290/42 |
| 6,877,581 B2 | * | 4/2005 | Badr et al. | 180/311 |

* cited by examiner

GIMBAL-MOUNTED HYDROELECTRIC TURBINE

BACKGROUND OF INVENTION

1. Field of the Invention

The present invention is generally in the field of power plants. More specifically, the present invention is in the field of hydrokinetic turbines with means to adapt to changes in streamline direction and magnitude of a free flowing motive fluid.

2. Description of Prior Art

For over two thousand years mankind has known of harnessing the kinetic energy in flowing water to perform mechanical endeavors. In the past two hundred years the pace in which developments emerged in the practice of hydraulics has accelerated. The advent of the turbine in the first half of the nineteenth century culminated in the present advancements in hydroelectric generation, with this period of innovation and intense interest peaking in the first quarter of the twentieth century. Since then, fossil fuels have dominated as the high net energy, readily available energy source in the production of electricity and other conveyors of power. With known fossil fuel reserves at what presently appears to be arguably half depleted, as well as the environmental impact of using a polluting energy source, there is a strong need to develop a renewable and sustainable source of energy to support humankind.

Presently the hydroelectric power plant industry earns revenues of approximately thirty billion dollars annually, but unfortunately is in a state of decline mainly due to the environmental and civic costs of implementing the existing technology. Environmental impact of the prior art hydroelectric power plant threatens extinction to aquatic species living downstream from the proposed power plant infrastructure, and also displaces all human inhabitants that live in what would become the flood plane of the infrastructure. It is estimated that over sixty million people have been displaced in the past century due to hydraulic power plant development with no mention of the number of species of plant and animal that have gone extinct. Furthermore, given the prior art technology, there still exists the possibility of life threatening flooding occurring downstream from the site of the hydraulic power plant infrastructure. Overall these costs have weighed heavily in civic planners' decisions in adopting hydroelectric power generation to the point of putting the industry in a state of such decline that leading companies involved in this business are contemplating other areas of endeavor.

Inherent problems in the prior implementation of hydroelectric power generation have exacerbated the present state of declining interest in this technology. The earliest implementation of hydrokinetic systems, commonly known as waterwheels, allowed less impact to the natural flow of the body of water from which these systems drew energy. With the greater efficiency gained by enclosing the impeller within the turbine came the need for more sophisticated penstock arrangements, which included greater infrastructure in the form of dams incurring the majority of the civil and environmental costs. The penstock, gate and impeller arrangements for these systems are physically coupled to sustain a given range of flow velocities and pressures over varying head and load so to maintain required synchronization to the end electrical alternating current output. This requirement imposes on these systems almost exclusive implementation in fresh-water systems with large scale infrastructure, increasing impingement on human habitats, and for the most part, neglecting the significant kinetic energy recoverable from one or more of various forms of oceanic flow.

Other prior art exists where the motive fluid is ocean water, but still requires significant infrastructure. In one form, dam like structures known as barrages compel tidal flow to affect a turbine. Some turbines exist that operate in free flow, but do not adapt to changes in direction and have limited capacity, typically less than a kilowatt. In another recently developed form, offshore platform structures behave as pistons on waves at medium depths, in turn pumping a motive fluid through a turbine and then requiring a long distance power cable generally carrying high voltage direct current back to shore, to be further processed. This likely incurs significant maintenance costs for the offshore platforms. Fully implementing this prior technology would likely impede shipping lanes as a farm of these platforms effectively fences the shoreline. This stands as one of several known environmental impacts of this prior technology with others hypothetically existing.

When one amortizes the total amount of energy that goes into building and maintaining a prior art hydroelectric power installation, it becomes obvious that it takes a considerable amount of time before the plant becomes net energy positive, or in other words, the point when the total investment of energy compared to the total recovery of energy is at the break-even point. As a further example, fossil fuel, not being a renewable resource, requires mining or drilling deeper and pumping farther to obtain a lower yield and lower quality of fuel incurring more costly refining to recover the remaining reserves at the end-of-life of a mine or a well. Thus, fossil fuel as an energy source clearly diminishes in net energy as time goes on, until it obviously becomes a sink, no longer a source. This latter example reinforces the inevitability of mankind's undeniable need for a sustainable and renewable source of energy. Contemplating the net energy curves of a renewable energy source and fossil fuel indicates a sense of urgency for the development of a renewable source. The timing of the cross-over point of when one source becomes net energy positive as the other becomes net energy negative will dictate the severity of the ensuing energy crisis and thus the impact on humanity. As time goes on it will be less likely an option to expend a great deal of energy as an investment while more mundane needs are no longer being met. Despite this sense of urgency in the need to develop renewable, sustainable sources of energy, as previously stated hydroelectric power plant development is actually declining.

Therefore, there exists a fundamental need for developing renewable and sustainable sources of energy including further exploitation of readily available known resources. More specifically, there exists a need for a novel approach to ensure low impact to environment and low civic infrastructure costs such that the energy investment return is most quickly realized. Utmost, to optimally exploit oceanic energy, such as that which arrives onshore, adaptability to inherently unsteady flow is prerequisite of any such system. A system that can achieve the above-specified goals would readily attain a relatively high net energy soon after its inception.

SUMMARY OF INVENTION

The present invention achieves the goals of overcoming existing limitations of present day hydroelectric power generation systems by first and foremost having the ability to extract power from a free flowing fluid. While prior art exists which functions in free flowing bodies of water, the novelty of this invention lies in its ability to respond and adapt to any change in the magnitude and direction of the streamlines of the free flowing motive fluid. This enables this invention to extract energy from breaking ocean waves, presently an untapped but readily available known source of energy.

Secondly, because adapting to change of both magnitude and direction of the streamlines of a free flowing motive fluid formed the basis of the guiding concepts of the present invention; this also avails the present invention the applicability to other bodies of water besides the ocean. Having been conceived for free flowing motive fluid use obviates the prior art's inherent need for large-scale infrastructure and thus eliminates two fundamental disadvantages presently challenging the hydroelectric power industry. The present invention does not require this scale of infrastructure and therefore greatly diminishes the environmental impact while attaining a positive net energy earlier upon implementation.

Overcoming the conceptual need for synchronization to the electric power grid positions the present invention as desirable for implementation in gathering energy for the emerging power conveyance systems, especially hydrogen fuel and fuel cell technology.

DETAILED DESCRIPTION

The present invention is directed to a gimbal-mounted hydroelectric turbine for adaptively extracting energy from a free flowing motive fluid that continuously changes direction and magnitude of flow. The following description contains specific information pertaining to various embodiments and implementations of the present invention. One skilled in the art will recognize that the present invention may be implemented in a manner different from that specifically depicted in the present specification. Furthermore, some of the specific details of the invention are not described in order to maintain brevity and to not obscure the invention. The specific details not described in the present specification are within the knowledge of a person of ordinary skills in the art. Obviously, some features of the present invention may be omitted or only partially implemented and remain well within the scope and spirit of the present invention.

The following drawings and their accompanying detailed description are directed as merely exemplary embodiments of the invention. To maintain brevity, some other embodiments of the invention that use the principles of the present invention are specifically described but are not specifically illustrated by the present drawings, and are not meant to exhaustively depict all possible embodiments within the scope and spirit of the present invention.

Figure 1:
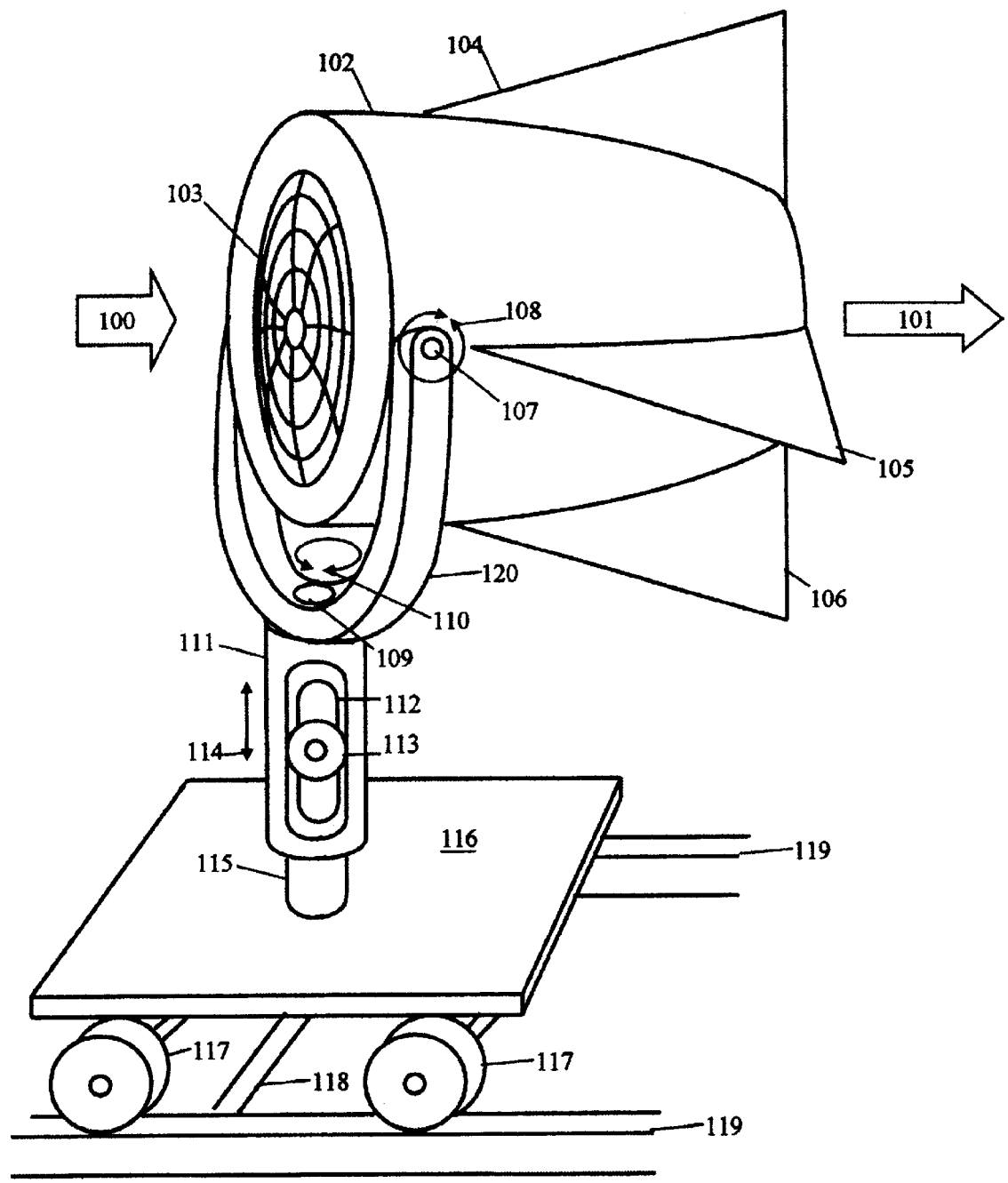
FIG. 1 illustrates a general perspective view of an exemplary apparatus in accordance with a preferred embodiment of the present invention.

FIG. 1 illustrates a general perspective view of an exemplary apparatus in accordance with one embodiment of the present invention. Arrow 100 indicates direction of the approaching flow of the free flowing motive fluid, impinging upon the face of the intake of the turbine, shown covered with a screen 103. The fundamental purpose of the screen 103 is to prevent loss of life of fish and other aquatic life forms as well as prevent various forms of debris from entering the turbine and obstructing normal operation. Arrow 101 is shown exiting the back of the turbine and is of different shape than arrow 100 to indicate a change in velocity through the turbine due to the difference in area of the intake compared to the draft area at the runner blades. This ratio of intake area to draft area, as well known for about four centuries in the science of fluid dynamics for incompressible flow, is equal to the ratio of draft velocity to intake velocity. This difference in area of the draft compared to the intake may obviously be inferred by the physical profile of the turbine shroud 102 in both FIG. 1 and FIG. 2, though the drawings are not necessarily to scale of the preferred embodiment. The factors governing the necessity of increasing the velocity of the flow through the turbine will be addressed subsequently. Note that the circular geometry of the intake and the shroud area implies use of a coaxial fluid coupler and henceforth changing to a rectangular intake and a crossflow impeller does not represent a significant departure from the scope of the present invention. Subsequent paragraphs in this specification will address the basis for choosing a coaxial impeller.

A fundamental and significant departure from prior art that provides considerable novelty in this invention is the implementation of the external vanes or rudders 104, 105, and 106 and the circular bearings 107, and 109. The combined use of circular bearings 107 and 109 comprise what results in a mechanical apparatus that one could commonly refer to as a two-axis gimbal, providing two degrees of freedom, specifically, freedom to move in any direction that has vector components that are parallel to a horizontal or a vertical plane. As depicted in FIG. 1, circular bearing 107 and its complement not shown but also affixed to the semi-elliptical follower brace 120 on the opposite side, with concentric pins affixed to the turbine shroud 102, forms an axis orthogonal to, and allows the turbine any motion parallel to, the vertical plane, whereas circular bearing 109 forms an axis orthogonal to, and allows the turbine any motion parallel to, the horizontal plane. For instance, as the free flowing motive fluid changes direction of its streamlines parallel to the horizontal plane by any arbitrary angle, this change in direction will exert a force on both rudders 104 and 106 causing torque about the bearing 109 resulting in motion parallel to the horizontal plane as represented by arrow 110 until arrival at mechanical equilibrium. Likewise, as the free flowing motive fluid changes direction of its streamlines parallel to the vertical plane by any arbitrary angle, this change in direction will exert a force on rudder 105 and a complementary rudder not shown on the opposite side of the shroud 102, causing torque about the bearing 107 and its complementary bearing not shown on the opposite side of the semi-elliptical follower brace 120, resulting in motion parallel to the vertical plane as represented by the arrow 108 until arrival at mechanical equilibrium. Thus the present invention adapts to any change in direction of the streamlines of a free flowing motive fluid. Obviously, adding or removing either a rudder or an axis to the gimbal employed within the preferred embodiment of the present invention would not constitute a substantial departure beyond the scope of the invention.

Proceeding further with the features depicted in FIG. 1, the semi-elliptic follower brace 120, is affixed to the outer casing of the circular bearing 109, the inner case of the bearing 109 is affixed to the sliding main shaft collar 111. The sliding main shaft collar 111 is illustrated in FIG. 1 as having a slotted tongue-and-groove arrangement 112, captivated by a non-binding washer 113 affixed through a screw to the main shaft 115. Said sliding assembly comprised of the slotted tongue-and-groove arrangement 112, and non-binding washer 113 permits the sliding main shaft collar 111 freedom of motion in the vertical direction as depicted by arrow 114. Note that the scale of this drawing is somewhat distorted in order to clearly display the sliding main shaft collar 111, the slotted tongue-and-groove arrangement 112, and the non-binding washer 113 sliding assembly whereas in the preferred embodiment the entire turbine and especially the diameter of the screen-covered face of the intake 103 would be scaled considerably larger than this main shaft assembly. While said assembly allows the freedom of motion in the vertical direction as depicted by arrow 114, the cause of such motion corresponds to variation in the level of the surface of the motive fluid as tracked by buoyancy of the shroud 102. The means of this buoyancy is further depicted in FIG. 2 and will be further addressed in subsequent paragraphs. The buoyancy causes the turbine to track the variation in the level of the surface of the motive fluid and thereby enables the turbine to always extract energy from an upper layer of the motive fluid, which is less susceptible to the effects of friction namely turbulence at the floor of the waterway. Thus the flow impinging the face of the turbine is less likely to be turbulent, more likely to be laminar, permitting more optimal extraction of energy. Clearly any variation in the above assembly including any change to the main shaft 115, the slotted tongue-and-groove arrangement 112, the non-binding washer 113, the sliding main shaft collar 111 or the buoyancy of the shroud 102, that continues to permit the intake of the turbine to extract energy from an upper, non-turbulent layer of the motive fluid does not constitute a substantial departure beyond the scope of the present invention.

The main shaft 115 is shown in FIG. 1 attached to the base 116. Under the base is a system of rollers 117 riding on a set of rails 119 driven from under the base 116 through the drive axle 118. Further detail of the drive system will be depicted in FIG. 10 and in subsequent paragraphs. The primary purpose this rail system serves is to optimally locate the entire turbine system adaptively to an area of flow where maximum energy may be extracted. A secondary purpose could include facilitating maintenance on any part of the system at a more convenient location than its in-service location. A third purpose could be for moving the turbine out of the way of any vessel needing to pass in the present vicinity of the turbine. Clearly any deviation from the above stated system, such as a winch and pulley system, which continues to allow the turbine system to be adaptively positioned, does not constitute a substantial departure beyond the scope of the present invention. Maximum energy extraction location for the unit has been initially considered the onshore side of breaking ocean waves but can be any area of highest velocity of flow in any body of motive fluid. One alternate example of this could be any body of water that has flow patterns that vary diurnally or seasonally.

Let it be known that the aforementioned features that enable the turbine to namely: adapt to any change in the direction of the streamlines of a free flowing motive fluid; extract energy from an upper, non-turbulent layer of water due to buoyancy of its shroud; adaptively position the turbine in an optimal flow location using the rail system; while originally conceived for accommodating use in breaking ocean waves, obviously are advantageous for use in other bodies of water such as, but not limited to rivers, creeks, inlets, tidal bores, rapids, or waterfalls. Therefore, use of the present invention in any body of water other than breaking ocean waves does not constitute a substantial departure beyond the scope of the present invention.

Figure 2:
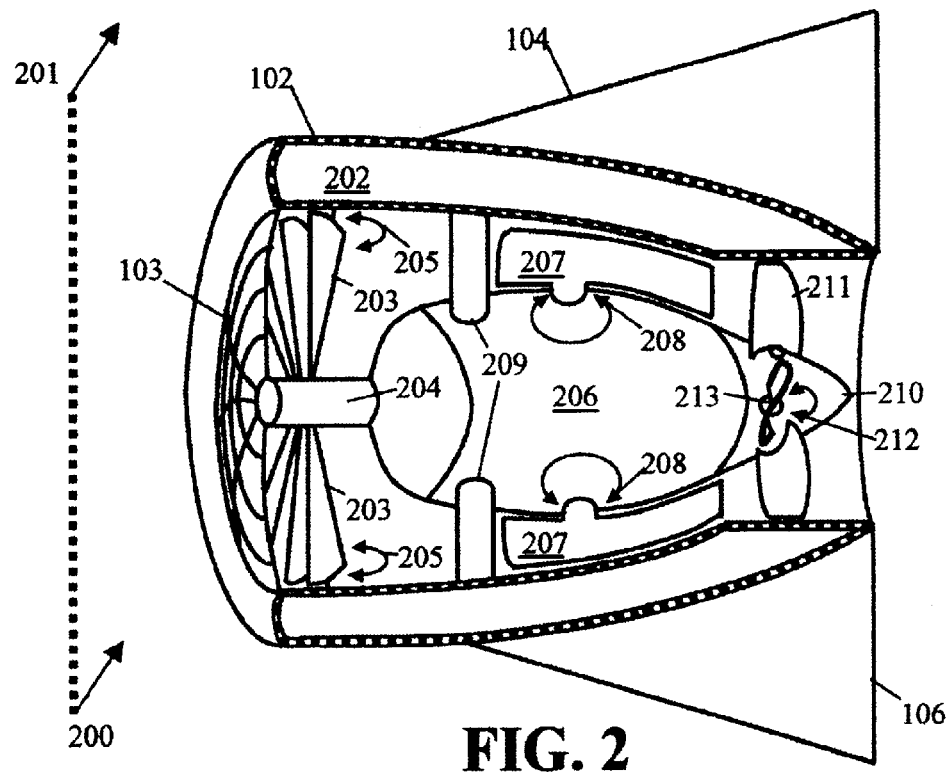
FIG. 2 illustrates a cross-sectional view length-wise along the turbine shroud in FIG. 1 according to a preferred embodiment of the present invention.

FIG. 2 illustrates a cross-sectional length-wise view interior to the shroud 102 of the turbine. The broken line defined by points 200 and 201 indicates the vertical plane is where the section is cut and the arrows proceeding from points 200 and 201 indicate the perspective direction of sight. The hatching of shroud 102 indicates it is the only element cut in this cross-sectional view with everything else contained within the shroud 102 remaining unaltered in this view. The hatch line delineates the shroud 102, and its cross-sectional circumference can be seen in FIG. 2 as creating an inner surface and outer surface and the cavity 202 within the inner and outer surfaces of the shroud 102. This cavity 202 is proposed to create the buoyancy of turbine unit itself. The cavity 202 may be filled with a material such as polystyrene foam that provides both structural support and buoyancy, or if less expensive, left vacant with the shroud 102 constructed or assembled watertight. This shroud 102 may also alternatively be constructed in such a manner as to render the cavity 202 gas-tight and useful in containing the output fuel— hydrogen gas as the end product if the energy captured by this turbine is used in the process of electrolysis of water.

Further elaboration on this cavity 202 for use in the production of hydrogen fuel will follow.

Figure 16:
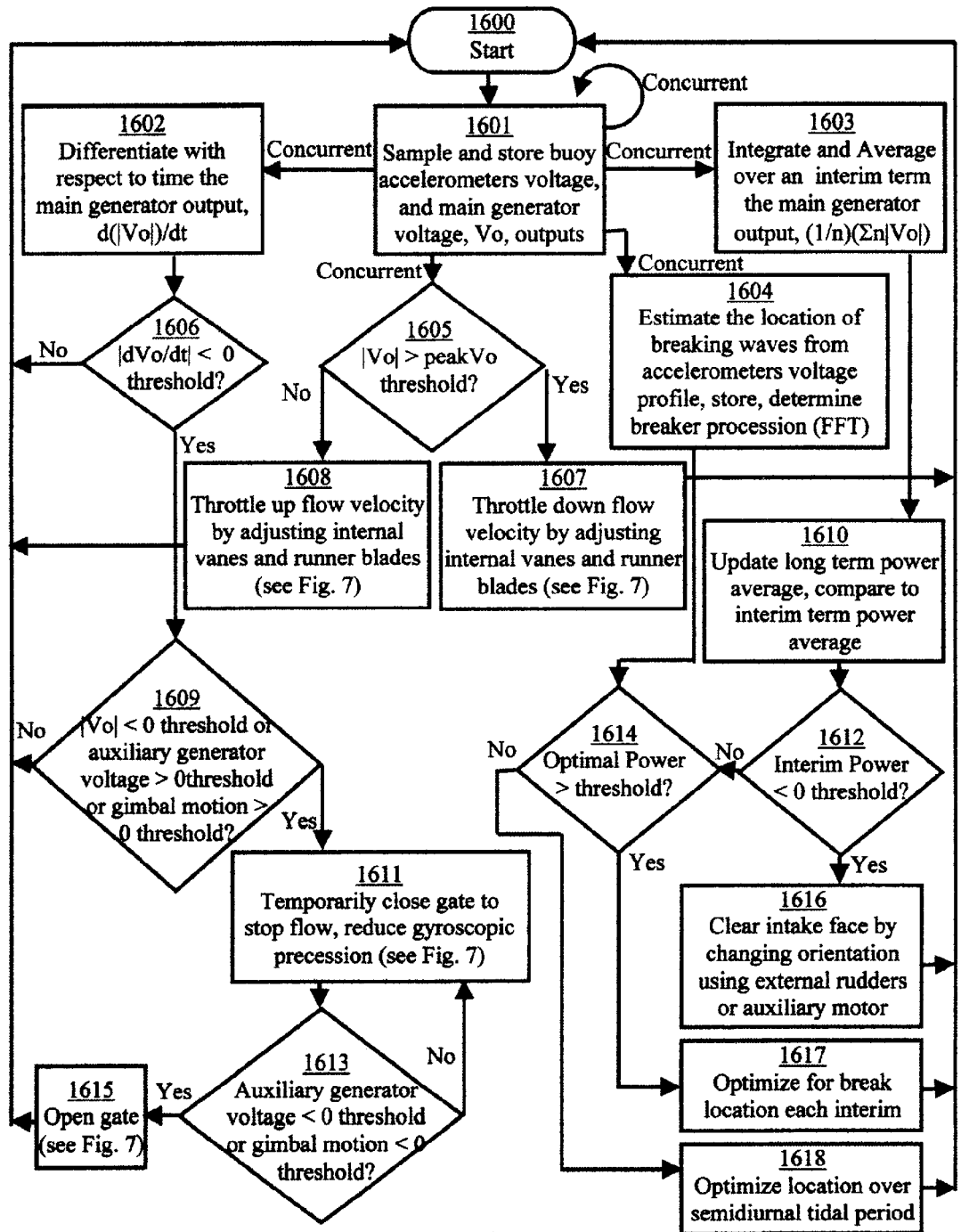
FIG. 16 illustrates the flowchart for control of the complete system according to the preferred embodiment of the present invention.

As discussed previously the contour of the shroud 102 especially its inner surface is seen in FIG. 2 to form a decreasing area orthogonal to the streamlines and thus causes the velocity of flow of the motive fluid to increase proportionally as it approaches the coaxial fluid coupler 210 in the draft area of the turbine from the screen-covered intake 103. This flow velocity as it thrusts upon the runner blades 211 actuates the rotational velocity of the coaxial fluid coupler 210 which affects the rotational velocity of the rotor of the generator contained within the generator housing 206. Ultimately, the choice of generator and particularly its synchronous speed predicates all requirements of flow velocity and will be discussed in more detail subsequently. In general, it may be stated at this point that the operation of the turbine would likely benefit from increasing the average flow velocity through the turbine since other means for reducing the effective velocity are readily attained. One such means of reducing the flow velocity includes closing the gate by rotating its wickets 203 as portrayed by arrows 205. Closing the gate in this manner will cut-off flow which serves to reduce the rotational velocity of the coaxial fluid coupler 210 thus reducing the forces of gyroscopic precession so to quicken the response of the gimbal to changes in direction of the streamlines of a free flowing motive fluid as it exerts a force on the exterior rudders 104, 105, 106. Continuous adjustment of the flow velocity can be achieved through altering the pitch of the interior flow vanes 207 and runner blades 211. FIG. 2 shows the direction of rotation of the interior flow vanes 207 by arrow 208 and the direction of rotation of the runner blades 211 about their bearings 213 by arrow 212. While only two interior flow vanes 207 are shown, it should be understood that in the preferred embodiment a minimum of at least four interior flow vanes 207 and as many as eight or twelve could be implemented and likewise a plurality of runner blades 211 could be implemented. The rotation and fundamental shape of the interior flow vanes 207 can reduce the effective area and thus increase flow velocity while channeling the flow into near vortical circulation as it thrusts upon the runner blades 211 at an angle optimal for energy extraction. This channeling of the flow could effectively transform turbulent flow at the screen-covered face 103 into laminar or vortical flow through the turbine. While some loss of energy may result from the friction on the sides of the interior flow vanes 207, coherently altering the pitch of the interior flow vanes 207 and the runner blades 211 optimizes the efficiency of the turbine over a range of flow velocities and generator loads. The algorithm for control of the pitch of the interior flow vanes 207 and the runner blades 211 is illustrated by FIG. 16, the mechanism for this control is illustrated by FIGS. 4, 5, 6 and 7 and is discussed in further detail in subsequent paragraphs.

One skilled in the art may recognize the turbine in the preferred embodiment of the present invention as a variation of the turbine invented by Viktor Kaplan in the first quarter of the twentieth century. The choice of this type of turbine, particularly a member in the class of impulse turbines originates from the notion that a free flowing motive fluid is inherently impulsive in nature, i.e. energy is optimally extracted by mechanically responding to the forces of a changing flow velocity impinging upon the turbine blades; as opposed to a member in the class of reaction turbines which derives energy in a system where static pressure in the draft area draws the runner into motion, an action similar to that of a siphon. In particular, the Kaplan turbine is well suited for adapting to changes in flow magnitude due to its adjustable flow vanes and runner blades, and is most often implemented in structures of low head, implying low static pressure in the draft characteristic of, and more resembling an impulse turbine and thus most analogous to use in breaking ocean waves. Nevertheless, implementation of a reaction turbine that responds to changes in direction and magnitude of the streamlines of a free flowing motive fluid in any manner similar to that of the present invention does not constitute a substantial departure beyond the scope of the present invention. Furthermore, it may be advantageous to implement the present invention with a turbine of recent advent that boasts of being bladeless, as it is well known that seawater is particularly corrosive to metals, breaking waves notably high in particulates, and thus a bladed runner highly susceptible to pitting on the blades and perhaps costly in terms of maintenance. In light of the aforementioned, this modification of a Kaplan turbine in the preferred embodiment is purely exemplary, illustrative and not restrictive. Thus, regardless of the impulse or reaction classification of such a bladeless turbine, an implementation of such a bladeless turbine that responds to changes in direction and magnitude of the streamlines of a free flowing motive fluid in any manner similar to that of the present invention does not constitute a substantial departure beyond the scope of the present invention.

Figure 3:
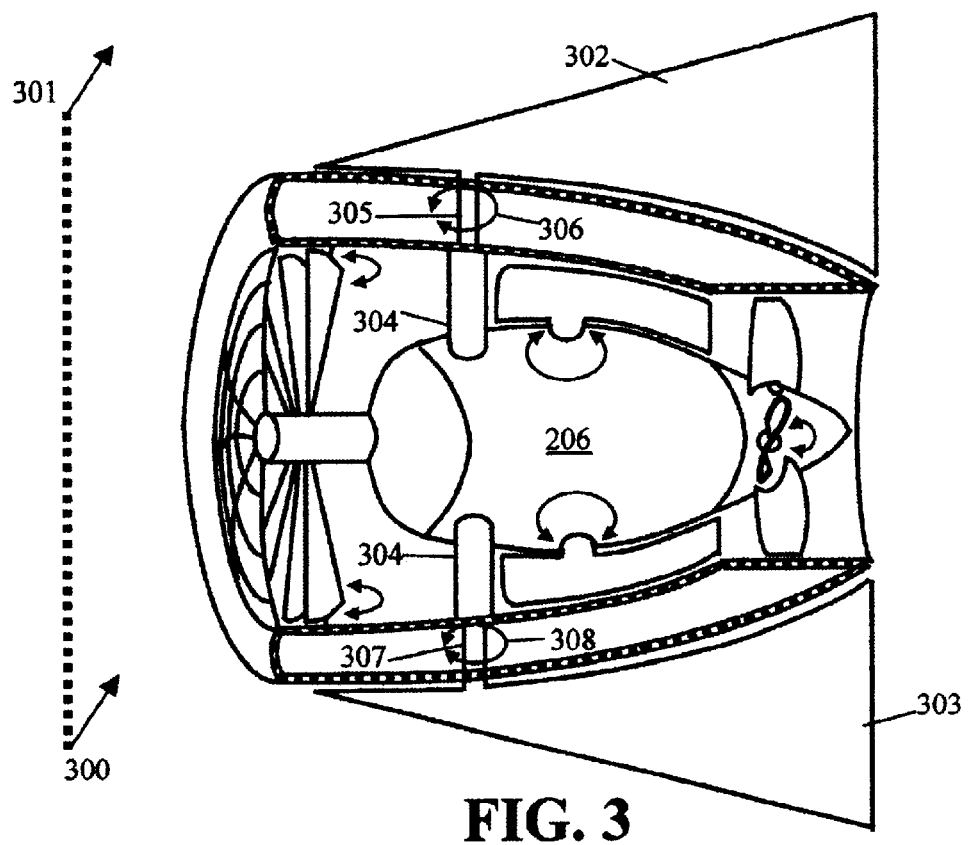
FIG. 3 illustrates a cross-sectional view length-wise along the turbine shroud in FIG. 1 according to an alternate embodiment of the present invention.

FIG. 3 illustrates a cross-sectional length-wise view interior to the shroud 102 of an alternate embodiment of the present invention that includes exterior rudders that are rotatable. The points 300 and 301 define the cross-sectional plane and angle of perspective in the same manner as points 200 and 201 in FIG. 2. The fundamental difference of this alternate embodiment of the present invention as depicted in FIG. 3 versus the embodiment shown in FIG. 2 is in the implementation of rotatable rudders 302, 303 versus fixed rudders, 104, 105, 106, respectively. Arrows 306, 308 encircling the shafts 305, 307 depict the direction of rotation of these rudders. The purpose of furnishing the turbine with rotatable rudders 302, 303 is, as before while in the same position as the fixed rudders 104, 105, 106, to enable the gimbal-mounted turbine to adapt to changes in the direction of the streamlines of the free flowing motive fluid. The additional benefit of rotatable rudders 302, 303 is to affect a change in the orientation of the face of the screen-covered intake 103 by assuming an alternate position with respect to the fixed rudders 104, 105, 106. By rotating the rudders 302, 303, in case over a long period of use the screen-covered intake 103 gets covered with tenacious debris such as seaweed, the turbine changes orientation such that the face is no longer orthogonal to the streamlines of the motive fluid thereby allowing the motive fluid to wash the debris from the screen-covered intake 103. This alternate embodiment exhibits another difference resulting from the aforementioned rotatable rudder feature that can be seen by comparison of the support columns 209 of FIG. 2 and the support columns 304 of FIG. 3. The modification to include hollow areas in the support columns 304 in which concentrically situated shafts 305, 307 drive the rotatable exterior rudders 302, 303 embodies the conduit for torque to the rotatable rudders 302, 303 originating from a driving motor member contained within the generator housing 206. Conversely, the support columns 209 of FIG. 2 strictly structurally reinforce the generator housing and impart power and control signals through slip rings in the columns 209 in the vicinity of the gimbals on the same axis as bearing 107 and its complement not shown on the opposite side of the turbine shroud 102. Greater detail into how power and control signals are routed as well as the mechanism for the rotatable rudders 302, 303 and the control of it follows in FIGS. 6, 7, 8, and 16, and subsequent paragraphs.

Figure 4:
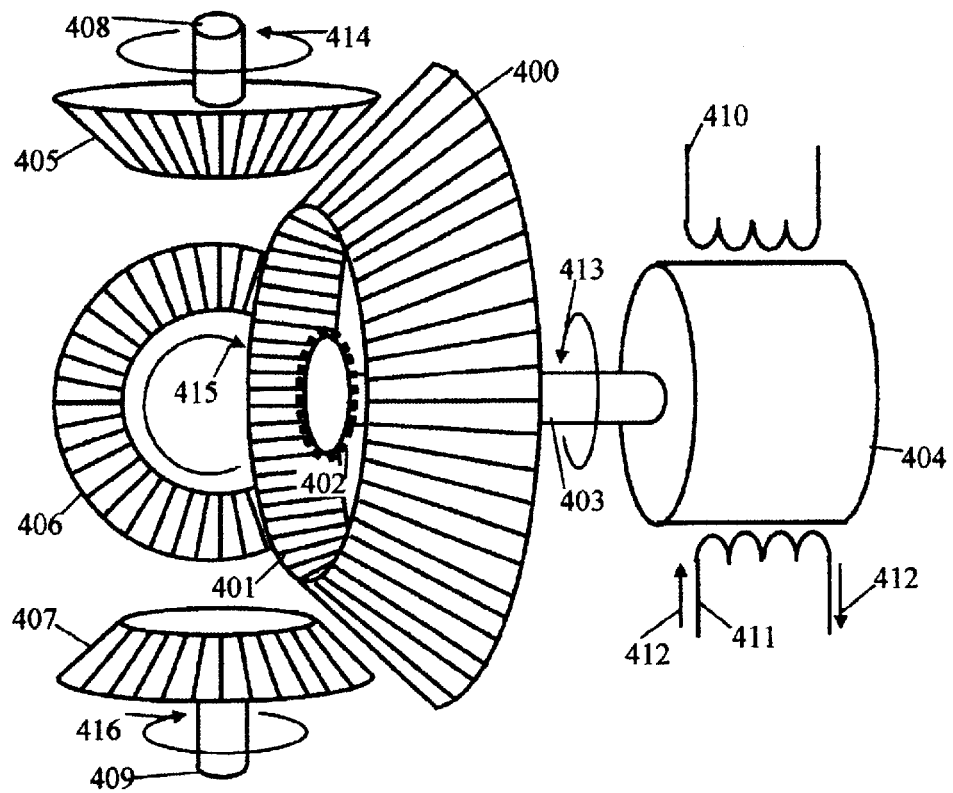
FIG. 4 illustrates a partially exploded perspective view of the pinion and motor mechanism for adjusting the interior flow vanes, runner blades, and gate wickets in FIG. 2.
Figure 5:
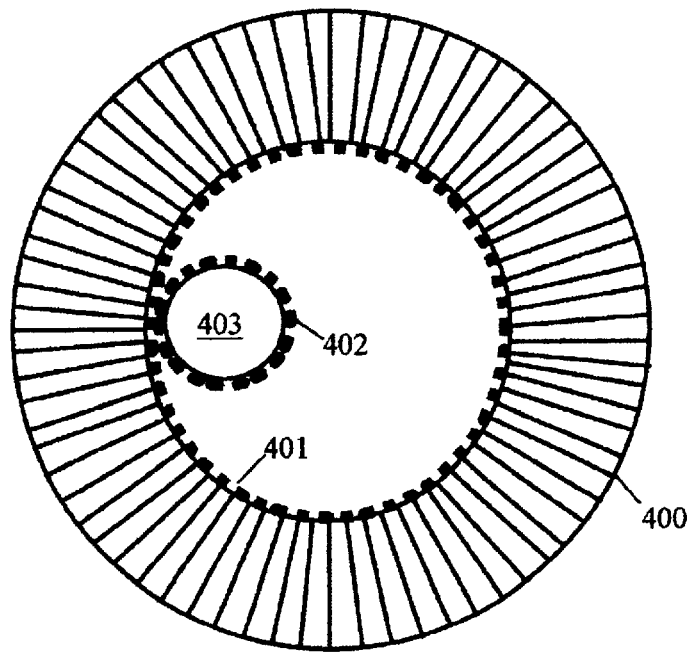
FIG. 5 illustrates an alternate view of the circular rack gear and motor rotor shaft pinion in FIG. 4.

FIG. 4 illustrates a partially exploded perspective view of the pinion and motor mechanism for adjusting the interior flow vanes, runner blades and gate wickets in FIG. 2. When an adjustment in any of the set of interior flow vanes 207, runner blades 211, or gate wickets 203 becomes necessary, for each set of interior flow vanes 207, runner blades 211, or gate wickets 203 one instance of the motor in FIG. 4 in the preferred embodiment a DC stepper motor 404, with its stator windings 410, 411 energized in the appropriate sequence, actuates rotational motion in its rotor shaft 403, in this example represented by arrow 413. The DC motor 404 has at the end of its rotor shaft 403 affixed to, forge or cast into a pinion 402 that meshes with the inner gear of a circular rack gear 400. Briefly directing the discussion to FIG. 5, an alternate view of this circular rack gear 400, meshing its inner gear 401 with the pinion 402 affixed, forged, or cast onto rotor shaft 403 is shown. Returning to FIG. 4, one can see the outer gear of the circular rack 400 engages the pinions 405, 406, 407 affixed, forged, or cast to the actuator shafts 408, 409. These actuator shafts 408, 409 represent any one of plural instances of the shafts previously alluded to, the shafts that drive the set of interior flow vanes 207, runner blades 211, or gate wickets 203. The mechanism driving the shafts 305, 307 for the rotatable rudders 302, 303 has some minor differences and is portrayed in FIG. 8 and will be addressed subsequently. The gear ratio of the pinion 402 to the inner rack gear 401 multiplied by the gear ratio of the outer rack gear of the circular rack 400 to the actuator shaft pinions 405, 406, 407 defines the translation of torque and angular displacement derived from the rotor shaft 403 resulting in the motion on the actuator shafts 408, 409 depicted by arrows 414, 415, 416 corresponding to each of the interior flow vanes 207, represented by arrows 208; each of the runner blades 211, represented by arrow 212; or each of the gate wickets 203, represented by the arrows 205. Because a singular instance of the mechanical assembly given in FIG. 4 actuates one set of each of the interior flow vanes 207, runner blades 211, or gate wickets 203, the location of these assemblies may be found in separate locations within the turbine shroud 102. In the preferred embodiment, the location for the assembly of FIG. 4 for the interior flow vanes 207 would optimally be placed within a central location of the generator housing 206; the location for the assembly of FIG. 4 for the runner blades 211 would optimally be placed within a central location of the coaxial fluid coupler 210; while the location for everything to the left of the shaft 403 of the assembly of FIG. 4, if not the entire assembly itself for the gate wickets 203 would optimally be placed within a central location of the fixed gate shaft 204. The advantage of using the circular rack gear 400 versus a simple worm gear mechanism is that especially in the instance of the interior flow vanes 207, the circumference of the inner gear 401, as most visible in FIG. 5, avails maximal clearance for the generator, itself. Obviously, a simple worm gear or single pinion to shaft coupling gear, for example the rack gear 400 directly affixed to the rotor shaft 403, may be implemented where central clearance is not critical. While this means of actuating motion in the interior flow vanes, runner blades, or gate wickets presents a novel departure from prior art, this preferred means is purely discussed in an exemplary manner, illustrative, not restrictive, and therefore any deviation from the above specification does not constitute a significant departure beyond the scope of the present invention.

Figure 6:
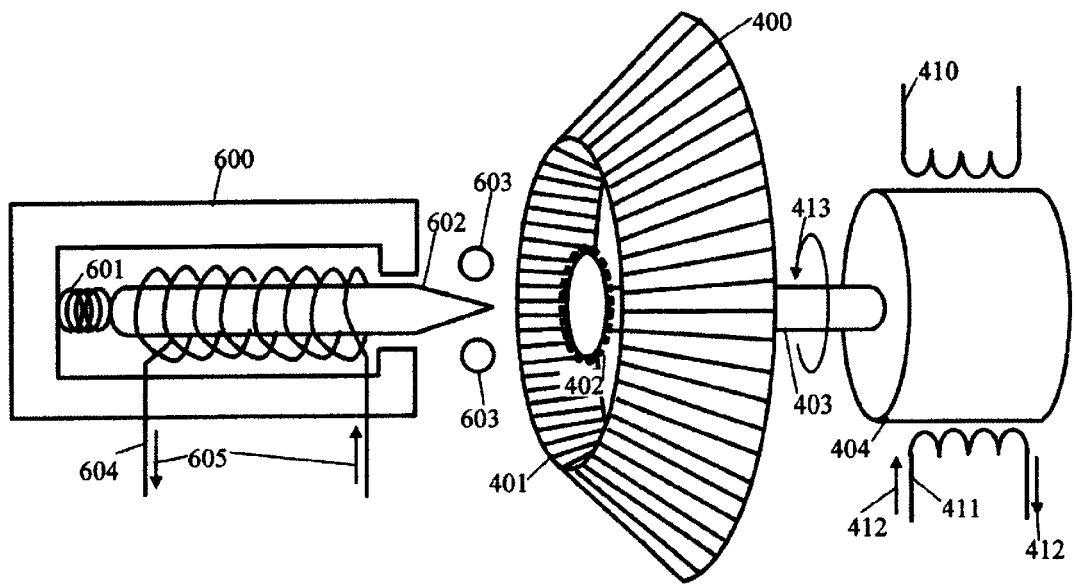
FIG. 6 illustrates the preferred means of bi-directional anti-backlash and position locking mechanism for the circular rack gear in FIG. 4.

Several fundamental advantages arise from employing a DC stepper motor 404, in actuating motion in the interior flow vanes 207, runner blades 211, gate wickets 203, or rotatable rudders 302, 303. The stepper motor is inherently a precise means of translating rotational displacement and therefore requires no feedback, or in other words may be implemented in an open-loop configuration affording more circuit complexity devoted to higher-level control of the system. Secondly, given the preferred means of bi-directional anti-backlash and position locking mechanism for the circular rack gear 400 as illustrated in FIG. 6, the stator coils 410, 411 of the DC stepper motor need powering only in the instances of performing an adjustment, serving to improve the overall efficiency of the turbine. Also, because this adjustment period comprises an exceedingly short duty cycle, in the order of tens of milliseconds every second in the most active member, the current for the stator coils 410, 411 is limited by the breakdown voltage of the coil winding insulation, not the thermal wear of the coil itself, as the average power dissipated by its resistive losses are averaged over a much longer period than its duty period. With the use of higher energizing currents, depicted by arrows 412, comes the advantage of greater torque deliverable to the actuated members in a more space efficient sized DC stepper motor.

Figure 8:
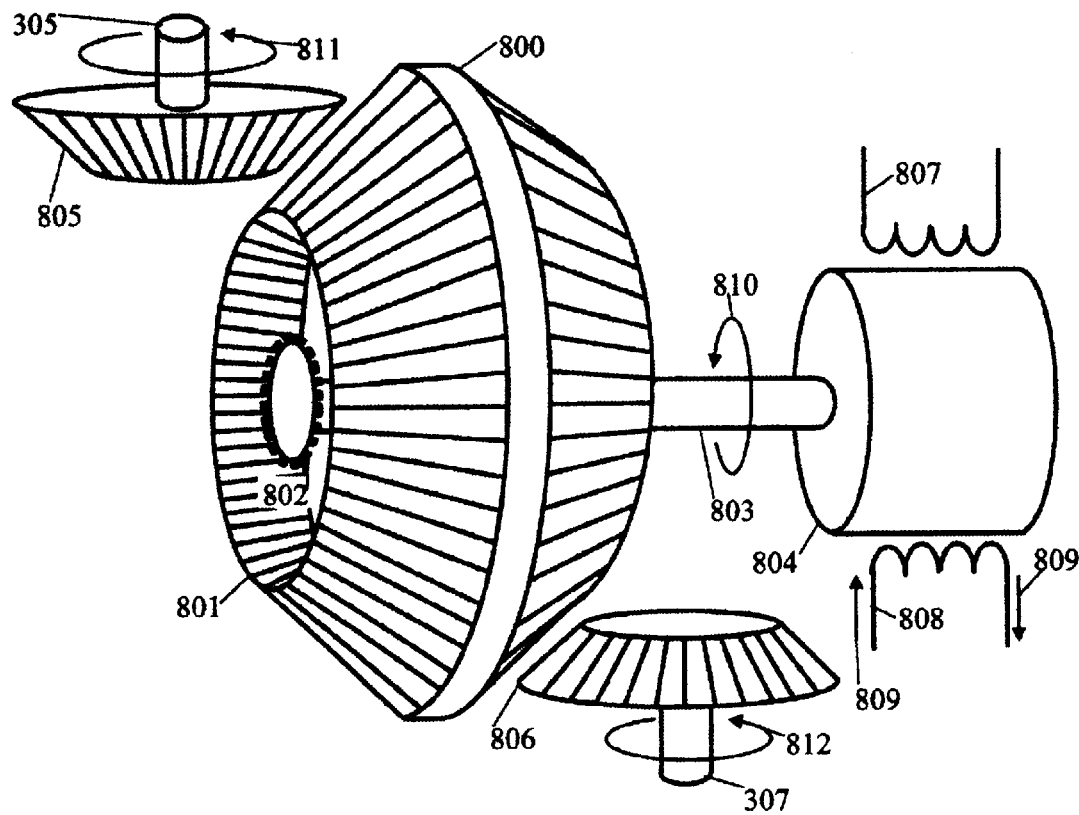
FIG. 8 illustrates a partially exploded perspective view of the pinion and motor mechanism for adjusting the external rudders of the alternate embodiment in FIG. 3.

In more detail, the components of FIG. 6 includes to the right of the circular rack gear 400, all the components previously defined in FIG. 4 and the foregoing paragraphs, with the addition of a solenoid 600 with a plunger 602 that engages between the teeth of either the inner gear 401 or the outer gear of the circular rack gear 400 to stop motion in the actuated members. The actuated members were omitted from FIG. 6 for sake of clarity though it could be presumed that the actuated members are situated as depicted in FIG. 4 or FIG. 8. The torque translated back to the plunger 602 from the actuated members is contained by the mounting of the solenoid core 600 and the stops 603 cast or forged on the inner surface of the generator housing 206, coaxial fluid coupler 210, or fixed gate shaft 204. The solenoid core 600 is shown spring loaded, with the solenoid spring 601 compressed by the retracted plunger 602 when the solenoid coil 604 has current flowing as depicted by arrows 605, in accordance to the right-hand rule. The physical positioning of the solenoid 600 core and the DC stepper motor 404 and its shaft 403 is displayed in a collinear orientation to attest the importance of mounting these components along the central axis of the turbine mounted within the gimbal in such a manner as to not disrupt the balance necessary, otherwise mechanical oscillation may occur thereby harming the system efficiency and possibly causing stress and shortened life of various components.

Figure 7:
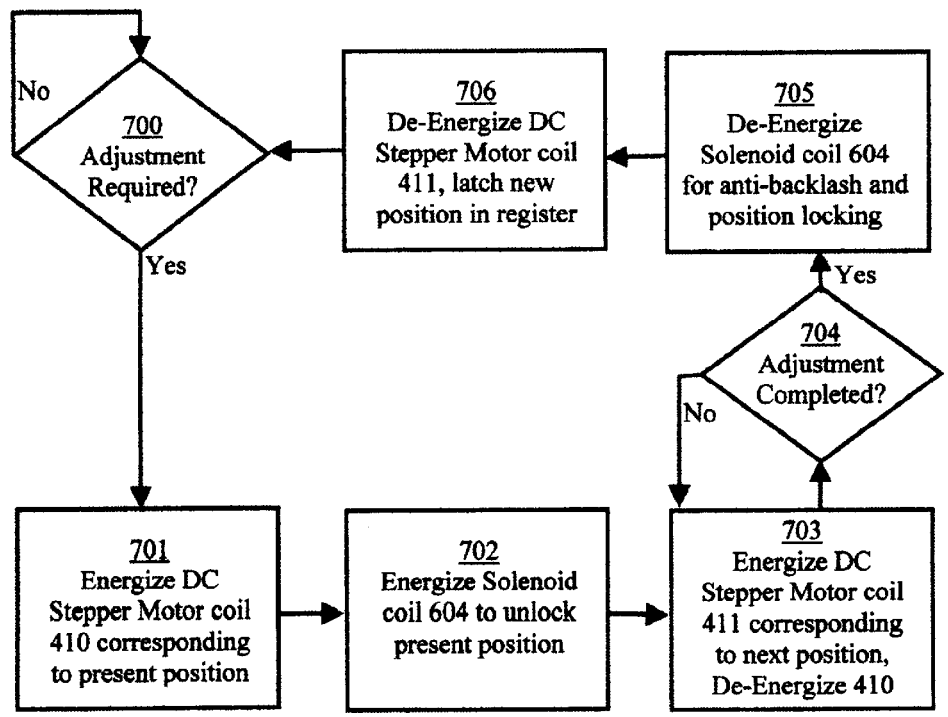
FIG. 7 illustrates the flowchart for synchronizing the bi-directional anti-backlash and position locking solenoid in FIG. 6 to the motor in FIG. 4.

FIG. 7 illustrates the flowchart for synchronizing the bi-directional anti-backlash and position locking mechanism of FIG. 6 to the pinion and motor mechanism of FIG. 4. From the start, the DC stepper motor stator coils 410, 411 and the bi-directional anti-backlash and position locking solenoid coil 604 is in the de-energized state 700. When any of the aforementioned actuated components requires an adjustment, assuming the present position of one of these components coincides with the position of the DC stepper motor rotor shaft 403 when its stator coil 410 is energized, the stator coil 410 is once again energized, state 701. Upon energizing the stator coil 410, the solenoid coil 604 is energized with a current as depicted by arrows 605, thereby causing the solenoid plunger 602 to retract and to unlock the present position by disengaging the plunger 602 from the teeth of the circular rack gear 400, state 702. Then to affect the necessary adjustment, assuming the position of the next step corresponds to energizing stator coil 411, a current depicted in FIG. 6 by the arrows 412 energizes stator coil 411 while stator coil 410 is de-energized. This actuates the motion in the rotor shaft 403 depicted by arrow 413; the direction of this arrow is arbitrary as implied by the term bi-directional anti-backlash and position locking mechanism. This completes states 703 and 704 for this example, though the system could continue to step in this manner through an arbitrary number of stator coils on the DC stepper motor 404, by reiterating state 703 as necessary to achieve the desired set point position of the rotor shaft for this adjustment. Upon obtaining the desired position, the solenoid coil 604 is de-energized by interrupting the current depicted by arrows 605, thereby permitting the solenoid spring 601 to decompress causing the solenoid plunger 602 to re-engage the teeth of the circular rack gear 400 at the new position, performing the operation of anti-backlash and position locking, state 705. Since this circular rack gear 400 is further coupled to plural actuated members through gears 405, 406, 407, and there remains some play in the gears, this results in some motion associated with backlash in the actuated members. But the precision of the rack gear 400 should be fine enough that this resultant motion in the actuated members is negligible for the overall system response. In the final state 706, the stator coil 411 is de-energized and the new position of the actuated member and of the corresponding stator coil is placed in a register, of discrete logic or microprocessor register or memory space, as DC stepper motors are amenable to digital control due to their discrete means of determining rotational displacement. More detail of the higher-level system control will follow in subsequent paragraphs and FIG. 16.

FIG. 8 illustrates a partially exploded perspective view of the pinion and motor mechanism for adjusting the rotatable rudders 302, 303. Most of the components of FIG. 8 are analogous to FIG. 4 with the exception of the circular rack gear 400 now having two beveled edges for the circular rack gear 800 of FIG. 8. Because the rotatable rudders 302, 303 need to move in the same direction in the horizontal plane to cause the screened face of the intake 103 to assume a non-orthogonal orientation with respect to the streamlines of the free flowing motive fluid, the pinion of one of the rotatable rudder shafts needs to mesh on the opposite side of the circular rack gear 800 compared to the pinion of the other rotatable rudder shafts. FIG. 8 illustrates this requirement by displaying first the current 809 flowing through the stator winding 808 of the DC stepper motor 804, assuming the current previously flowed in stator winding 807, causing the rotor shaft 803 to rotate in the direction of arrow 810. As before, in the preferred embodiment, because the bi-directional anti-backlash and position locking mechanism in FIGS. 6 and 7 captivates the circular rack gear 800 while at rest, the direction of rotation depicted by arrow 810 is arbitrary. The motion depicted by arrow 810 causes the circular rack gear 800 to rotate in the same direction due to the meshing of the rotor shaft pinion 802 to the inner gear 801 of the circular rack 800, whose outer gear meshes with the actuator shaft pinions 805, 806 resulting in motion shown by arrows 811, 812. Actuator shafts 305, 307 thus turn the rotatable rudders 302, 303 in the same direction in the horizontal plane. As with the other actuators, the gear ratio of the rotor shaft pinion 802 to the inner rack gear 801 multiplied by the gear ratio of the outer rack gear of the circular rack 800 to the actuator shaft pinions 805, 806, defines the translation of torque and angular displacement derived from the rotor shaft 803 resulting in the motion on the actuator shafts 305, 307 depicted by arrows 811, 812, corresponding to the torque and angular displacement of the rotatable rudders 302, 303. As shown in FIG. 3, because the rotatable rudder shafts 305, 307 conjoin within a central location of the generator housing 206, and the circular rack gear 800 is perfectly analogous to the circular rack gear 400, the circumference of the inner gear 801 or as most visible in FIG. 5, the circumference of inner gear 401, avails maximal clearance for the generator, itself. Obviously, a simple worm gear or single pinion to shaft coupling gear, for example the rack gear 800 directly affixed to the rotor shaft 803, may be implemented where central clearance is not critical. While this means of actuating motion in the rotatable rudders presents a novel departure from prior art, this preferred means is purely discussed in an exemplary manner, illustrative, not restrictive, and therefore any deviation from the above specification does not constitute a significant departure beyond the scope of the present invention.

Figure 9:
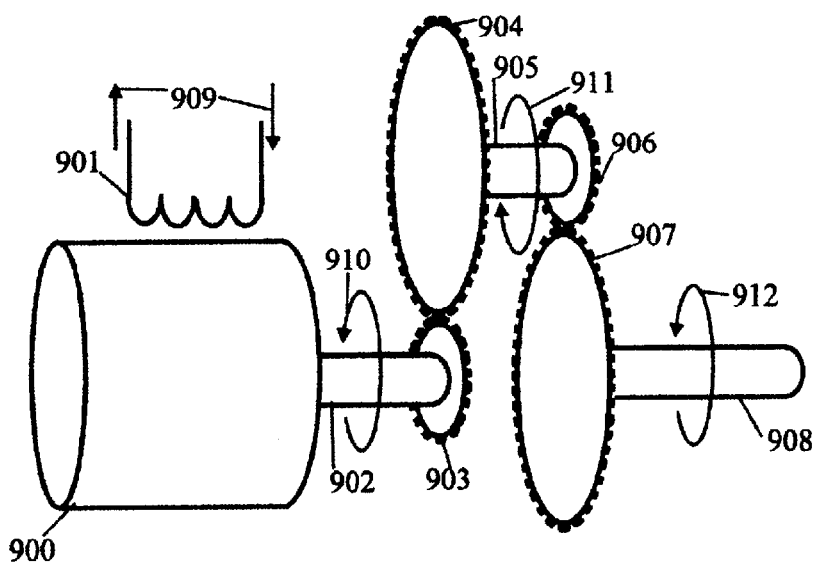
FIG. 9 illustrates a system of gears that increases the rotational velocity of the rotor of a generator compared to directly coupling the rotor to the actuating member.

FIG. 9 illustrates a system of gears that decreases rotational velocity and displacement from the rotor shaft of a motor to an actuated member, or conversely, increases rotational velocity and displacement from an actuating member to a rotor shaft of a generator. Member 900 may either be an AC induction or a DC generator or motor depending on the synchronous speed of the rotor compared to the armature current frequency in the case of the AC induction motor or generator, or in the case of the DC motor or generator, the direction of the armature current depicted by arrows 909, flowing through the armature coil 901. Therefore the speed voltage presented across the conductors of the armature coil 901 by the current 909 is proportional to the rotational velocity of the actuator 908 represented by arrow 912 multiplied by the ratio of gear 907 to gear 906 multiplied by the ratio of gear 904 to gear 903. The arrows 910, 911, and 912 merely describe the translation of motion through the gears. The physical positioning of the actuator 908 and the motor or generator 900 and its rotor shaft 902 is displayed in a collinear orientation, though as some implementation of these mechanical components of FIG. 9 most likely will not occupy a location within the turbine shroud 102, this is purely shown as a means most efficient for space. In some embodiments this mechanical assembly will occupy a space within the generator housing 206 and thus the actuator 908, the motor or generator 900, its rotor shaft 902 and the tertiary shaft 905 is displayed in FIG. 9 in a collinear orientation as previously, to attest the importance of mounting these components along the central axis of the turbine mounted within the gimbal in such a manner as to not disrupt the balance necessary, otherwise mechanical oscillation may occur thereby harming the system efficiency and possibly causing stress and shortened life of various components. This specification will expound upon the purpose of this mechanical assembly in FIG. 9 in subsequent paragraphs and in FIGS. 13 and 15.

Figure 10:
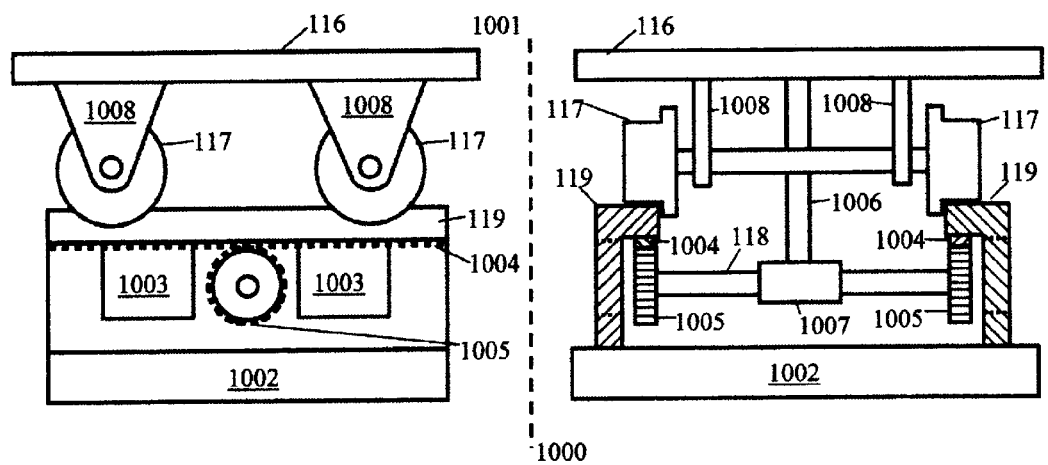
FIG. 10 illustrates the mounting system affixed to a rail system in accordance to the preferred embodiment.

FIG. 10 details the base 116 and associated mechanical components below it. The broken line defined by points 1000 and 1001 indicate alternate views. The left side of the broken line 1000-1001 views from underneath the center of the base 116 looking outward orthogonal to the rails, while the right hand side of the broken line 1000-1001 views the underneath of the base 116 from a distance parallel to and in between the rails 119. The base 116 rests on the supports 1008 coupled to the axle of the rollers 117. The rollers 117 rotate freely on the rails 119. The rails 119 are secured to a foundation 1002. In the preferred embodiment, this foundation 1002 is formed reinforced concrete, though it could consist of the local natural rock formation depending upon where the application of this invention occurs. Ideally this foundation 1002 is located on the tip of a headland formation where wave energy is most focused, and is sloped of adequate angle with respect to the true horizon so to elicit breaking waves of the plunging or surging type that transfer wave energy into particle velocity in a most concentrated location and succinct time frame. The rails 119 have cutouts 1003 that permit cross flow and thus prevent sand from drifting to the point of obstructing the movement of the drive gears 1005 that meshes with the rail rack gear 1004. When stationary, the drive gears 1005 lock indirectly by coupling through its axle 118 to an internal drive gear not shown locked by a means such as the previously described bi-directional anti-backlash and position-locking mechanism to hold the drive gears 1005 steady in the path along the rail which also create tension to hold the system upright against any lateral tilting force. In the preferred embodiment, the means of driving the gears, again most easily implemented as a DC stepper motor, will likely occupy an area in the lower portion of the main shaft 115 or perhaps a compartment not shown under the base 116. The rotor shaft of this motor therefore occupies a location concentric to the drive shaft housing 1006 and has a worm gear not shown on its end occupying the gear box 1007. Said worm gear meshes with the internal drive gear, not shown inside the gear box 1007, but parallel to the gears 1005 and mounted such that it directly drives the axle 118. The bi-directional anti-backlash and position locking mechanism not shown also occupies the gear box 1007 and mates and locks the internal drive gear not shown inside the gear box 1007. A detailed discussion of exemplary sensor input means and the control algorithm itself for the above rail system follows in subsequent paragraphs describing FIG. 11 and FIG. 16.

Figure 11:
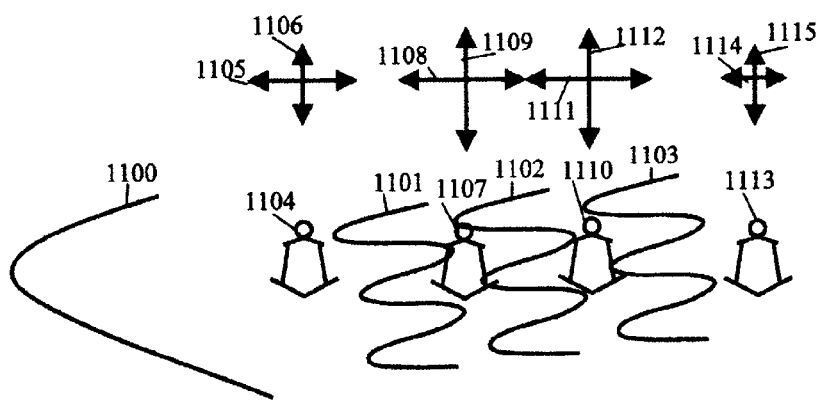
FIG. 11 illustrates a system of buoys equipped with accelerometers and their respective vector output signal profiles relative to position of breaking waves for one embodiment.

FIG. 11 illustrates a system of buoys 1104, 1107, 1110, 1113 mounted in a collinear orientation parallel to the ordinary direction of onshore flow of breaking waves, orthogonal to the tangent of the shoreline 1100. This system of buoys aids in adapting the gimbal-mounted turbine to maximal flow along the path of the aforementioned rail system. The buoys 1104, 1107, 1110, 1113 are equipped with accelerometers or other means of measuring force or acceleration and their output signal profiles 1105, 1106, 1108, 1109, 1111, 1112, 1114, 1115, respectively portray characteristics relative to the position of breaking waves. For example, the buoy 1113 shown to the right, or offshore from the breaking wave 1103 has accelerometers or any other means of measuring force or acceleration including but not limited to spring actuated scales. Here the accelerometers mounted on buoy 1113 outputs two unique signals, i.e. voltages, corresponding to physically a horizontal component and a vertical component of force or acceleration which over time span the range delineated by arrows 1114 and 1115, respectively. Because this buoy 1113 is situated offshore with respect to the breaking wave, one may expect these signal amplitude profiles 1114, 1115 to be of moderate amplitude and of sinusoidal waveform, as one would expect from the undulating motion atop shoaling, but non-breaking waves. Note that the output profiles of all the vertical components 1106, 1109, 1112, 1115 of all the accelerometers show a greater extent in the downward direction. This indicates the constant offset produced by the force of gravity, and may be used to determine the relative angle of the buoy accelerometer system to true vertical and horizontal axes. On the other end of the line of buoys, the first buoy 1104 going from the beach in the offshore direction is located onshore from the last breaking wave 1101. Its accelerometer output amplitude profiles 1105, and 1106 are indicative of a small, short duration impulse in the vertical direction with greater amplitude and duration in the horizontal axis as the onshore bore and offshore retreat associated with plunging or surging breakers proceeds. Ideally the optimal placement of the turbine system would be in the vicinity of buoy 1107 or buoy 1110 whose accelerometer's output signal profiles in the horizontal axis 1108 and 1111 respectively indicate greatest magnitude in the likely form of a large impulse with a decay of long duration in the onshore direction as the wave plunges or surges and a linear ramp-up in the offshore direction as it retreats. The vertical components 1109, 1112 would also likely exhibit an impulse of large amplitude of only short duration while being lifted by the onshore bore. Of course the output profiles of buoys 1107, 1110 would vary from that shown to something more resembling the output profiles from the buoys on the ends, as the location within the surf zone of the breaking waves 1102, 1103 varies with time. Statistical and frequency domain analysis could serve to determine the optimal location for extracting energy within the surf zone amongst these two buoys 1107, 1110 and will subsequently be expounded upon. While shown in an orientation parallel to the ordinary direction of onshore bore of breaking waves, both this buoy system and particularly the rail system is equally suitable for implementation across an inlet, orthogonal to its tidal bore, or across a river orthogonal to its flow. Thus the buoy and especially the rail system exists for adaptively locating the entire turbine system to an area of optimal flow, regardless of body of water wherein implemented or whether the variation of location of optimal flow velocity is diurnal due to tides or seasonal due to weather patterns. Uses other than the aforementioned alternate uses including removal of the unit from obstructing waterway traffic or removal for facilitated maintenance do not constitute a substantial departure beyond the scope of the present invention. The control algorithm of the complete system including the implementation of the buoy and rail system will be delineated in FIG. 16 and subsequent paragraphs.

Figure 12:
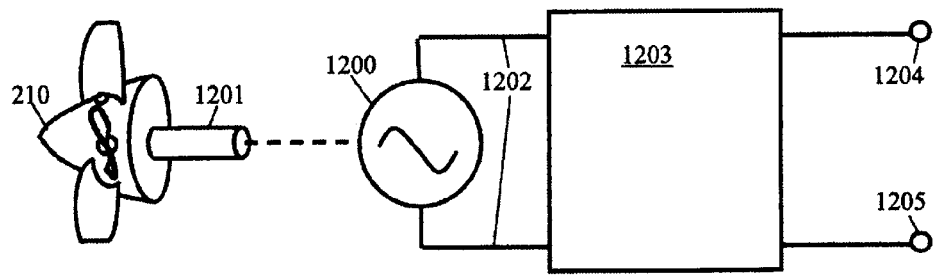
FIG. 12 represents a schematic view of an AC induction generator directly coupled to the output shaft of the coaxial fluid coupler according to one embodiment.
Figure 13:
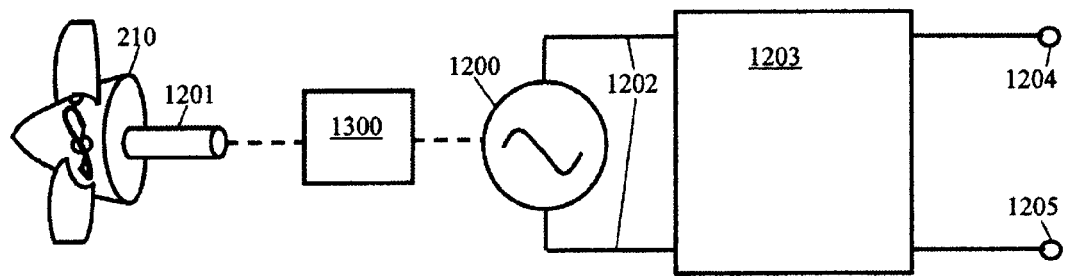
FIG. 13 represents a schematic view of an AC induction generator indirectly coupled to the output shaft of the coaxial fluid coupler through the system of gears in FIG. 9 according to one embodiment.

FIGS. 12, 13, 14, and 15 depict various coupling configurations and energy extraction means from the coaxial fluid coupler or other actuator means through to the output conditioning circuitry of the electric generator. FIG. 12 shows the fluid coupler 210 having a shaft 1201 that directly couples to the rotor shaft of an AC generator 1200. The fluid coupler 210 physically occupies the space within the draft area of the shroud 102, while the coupler shaft 1201 extends into the generator housing 206. Note that the shaft 1201 in FIG. 12 is a simplified representation of the coaxial fluid coupler shaft, and in the preferred embodiment would likely also contain slip rings to impart electrical power and control signals to the aforementioned electromechanical means internal to the coupler 210 for adjusting the pitch of the runner blades 211. In one embodiment, the AC generator 1200 would preferably be an AC induction generator of adequate number of poles such that its synchronous speed, which determines whether the AC machine is operating in its generator or motor region according to its torque-slip curve and is inversely proportional to the number of poles, is well below the average rotational velocity of coaxial fluid coupler 210, and therefore the AC machine operates with positive slip as a generator. As previously mentioned the ratio of the area of the screen-covered intake 103 to the area orthogonal to flow within the draft section in the shroud 102 that the fluid coupler 210 occupies is directly proportional to the ratio of velocity of the motive fluid approaching the runner blades 211 to the velocity of flow entering the screen-covered intake 103, and therefore also determines the average rotational velocity of the fluid coupler 210, and thus also affects the calculation of the required synchronous speed of the generator 1200. What makes the AC induction generator preferable is its economical, reliable construction and widespread use, rendering this type of generator easily attainable and cost effective. Also, asynchronous AC induction generation requires little additional circuitry in order to apply power directly to the utility power grid. In the case of unavailability of an AC generator of sufficient number of poles for an adequately low synchronous speed to operate with positive slip given the average rotational velocity of the fluid coupler 210, FIG. 13 depicts an AC induction generator 1200 indirectly coupled to the coaxial fluid coupler 210 through the gear system 1300. The gear system represented by block 1300 in its simplest implementation is that of FIG. 9 wherein this implementation the actuator shaft 908 is the coupler shaft 1201 and the rotor shaft 902 is that of the AC induction generator 1200, and the gear system increases the rotational velocity of the rotor shaft with respect to the coupler shaft 1201 as previously described. The gear system would likely occupy space within the generator housing 206 in proximity to the generator 1200. From the generator 1200 comes two leads 1202 representing the power mains off of the armature coil of the generator 1200. Though two leads 1202 imply a single-phase machine, this is purely exemplary, and no pre-determination is placed on the number phases of the machine in the preferred embodiment. In order to directly apply the voltage from the AC induction generator 1200 to the utility power grid through wires 1204, 1205, the electrical circuit represented by block 1203 contains a watt-hour meter, and a speed dependent switch that receives an input signal from a velocity transducer sensing the rotation of the coupler shaft 1201 in the generator housing 206. The velocity transducer output signal would therefore also need to be physically routed along the same path as the leads 1202, either on its own conductor or modulated upon the armature coil power current. This speed dependent switch affords highest efficiency and protection such as when the coupler shaft has inadequate velocity for positive slip, or there exists a fault condition on either side of the circuit block 1203, the generator 1200 becomes disconnected from the utility power grid. The circuit block 1203 is likely physically located on land away from the turbine unit, with the leads 1202 routed from the generator 1200, through slip rings in the columns 209 in the vicinity of the gimbals on the same axis as bearing 107, through slip rings near bearing 109, down to the base 116, out along the rail system 119 to the onshore location of the circuit block 1203. As with the leads before the circuit block 1203, though only a pair of wires 1204, 1205 are shown implying a single-phase system, this is purely exemplary with no pre-determination of the number of phases that may be applied to the utility power grid.

Alternately, the circuit block 1203 may take the AC voltage produced by the generator 1200 from leads 1202 and full-wave rectify the AC voltage into a DC voltage, then filter and further regulate the voltage and current for optimal power conditioning for application to loads as described in the following paragraphs regarding DC power generation.

Figure 14:
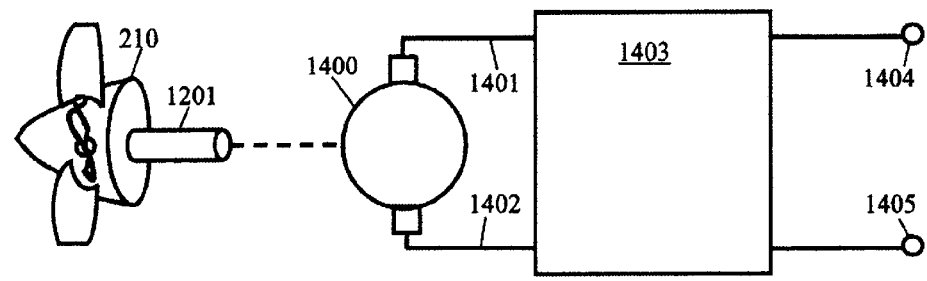
FIG. 14 represents a schematic view of a DC generator directly coupled to the output shaft of the coaxial fluid coupler according to one embodiment.

FIG. 14 illustrates an alternate arrangement from the coaxial fluid coupler 210 through to the power output means. Here the simplified representation of the coupler shaft 1201 is shown directly coupled to the rotor of a DC generator 1400. The DC generator 1400 may be any of available forms of DC generator, including but not limited to a commutated or semiconductor-rectified generator, and preferably with a self-excited shunt field winding configuration chosen for its combined simplicity and relatively constant voltage independent of load current. The DC generator 1400 then produces a speed dependent DC voltage on the leads 1401 and 1402 that feeds the power conditioning circuit block 1403. The power conditioning performed within the circuit block 1403 could include filtering spurs caused by commutation, and regulating voltage and current for optimally applying the generated power to output means. Regulation would preferably be of the most efficient known variety, in most cases chopped or in other words, switch-mode buck, boost or buck-boost regulation, depending upon the speed voltage of the generator 1400 and the load requirement. A variety of loads may be applied by connection to the leads 1404, 1405 depending upon end user needs. Examples of loads could include charging any variety of available chemistries of battery; the leads 1404 and 1405 themselves could terminate as the electrodes in the process of electrolysis of water to produce hydrogen fuel; or the leads 1404 and 1405 could further power a DC motor coupled to a synchronous AC generator directly applied to the utility power grid.

In the case of the load being the charging batteries, the circuit block 1403 could occupy the physical location of the generator housing 206, but because the process of battery charging generally requires low-error voltage sensing at the battery terminals and low-error temperature sensing from a thermistor within the cell packaging powered by an accurate reference, it would likely be more feasible and economical to locate the power conditioning circuit block 1403 in proximity of the battery unit to be charged on shore. Therefore the leads 1401, 1402 would likely route unconditioned DC power from the generator 1400, through slip rings in the columns 209 in the vicinity of the gimbals on the same axis as bearing 107, through slip rings near bearing 109, down to the base 116, out along the rail system 119 to the onshore location of the circuit block 1403.

Another exemplary load could be the current required to perform electrolysis on water to produce hydrogen fuel. This process achieves a high efficiency due to inherent advantages in the preferred embodiment of the present invention. Seawater is naturally electrolytic thereby reducing chemical processing costs; and advanced electrolysis methods allow for a voltage as little as one and a half to two volts applied across the electrodes, which the generator 1400 in the self-excited shunt field winding configuration can easily provide over a wide range of rotational velocities of the fluid coupler 1201. In one embodiment, the cavity 202 within the shroud 102, otherwise vacant to provide buoyancy to the turbine, could also provide the physical volume to store the hydrogen fuel output from the process of electrolysis of water. Given the requirements for such a system for electrolysis, the circuit block 1403 could consist of simply a filter capacitor to smooth the spurs caused by the commutator of the DC machine, and likely a switch-mode buck or in other words, stepdown DC-to-DC converter, perhaps with some form of current regulation, to provide the appropriate voltage to the electrodes 1404, 1405 to perform electrolysis. Because this circuit block 1403 is relatively simple and compact, it would most economically occupy an area adjacent to the generator 1400 within the generator housing 206, with the leads 1404 and 1405 routing conditioned DC power to the electrodes contained within the appropriate sections of the cavity 202 in the shroud 102, producing hydrogen fuel stored in the cavity 202 generated through electrolysis of seawater admitted into the appropriate section of the cavity 202 in a controlled manner through a filter membrane.

A third exemplary load for the DC generator 1400 could exist in the form of the leads 1404, 1405 attached to a DC motor further coupled to an AC synchronous generator directly applied to the utility power grid. In consideration of this application, the circuit block 1403 would necessarily not only require filtering to smooth the spurs caused by commutation, and voltage regulation to maintain constant speed in the DC motor coupled to the synchronous AC generator, but likely would further require high capacity charge storage devices in the form of a very large capacitor or bank of capacitors or possibly a battery, also in order to maintain constant speed in the DC motor coupled to the synchronous AC generator during periods of reduced rotational velocity in the axial fluid coupler 210. The complexity and physical volume of such a circuit dictates that the circuit block 1403 is located in the vicinity of the DC motor and AC synchronous generator. As such, the leads 1401, 1402 would likely route unconditioned DC power from the generator 1400, through slip rings in the columns 209 in the vicinity of the gimbals on the same axis as bearing 107, through slip rings near bearing 109, down to the base 116, out along the rail system 119 to the onshore location of the circuit block 1403.

Figure 15:
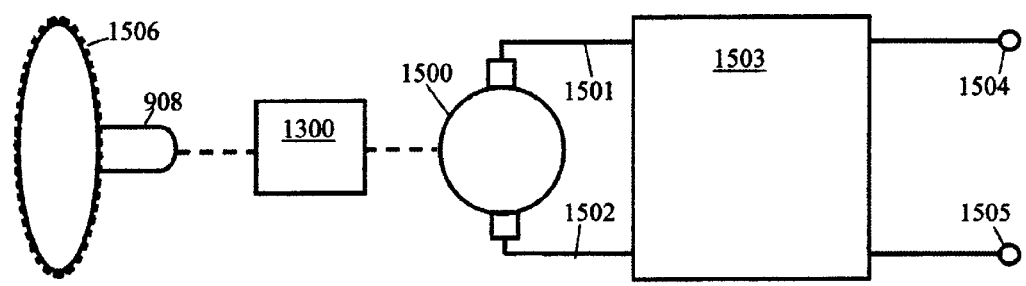
FIG. 15 represents a schematic view of a gear indirectly coupled to the rotor of an auxiliary DC generator through the system of gears in FIG. 9 according to one embodiment.

FIG. 15 illustrates an auxiliary generator 1500 attached through a system of gears 1300 to an actuator 1506. The proposed primary provider of mechanical torque for this auxiliary generator 1500 is the rotating sections in the vicinity of the bearing 109. Gear 1506 rotates while its teeth mesh with a circular rack gear not shown of greater circumference than, and concentric to, the bearing 109, affixed to the follower brace 120 rotating with respect to the main shaft collar 111. In this instance the actuator shaft 908 would be coaxial, but not likely concentric, to the main shaft collar 111, and the gear system 1300 and the auxiliary generator 1500 would also occupy a location affixed within the main shaft collar 111. This axis of the gimbal is chosen given that the onshore bore and offshore retreat of breaking waves acting upon the rudders and the gimbal would give this axis significant periodic motion, though in other implementations, the other axis of the gimbal may prove prolific in extracting power. As before, the block 1300 represents the system of gears described in FIG. 9, the end result is that the auxiliary generator's 1500 rotor shaft exhibits a higher rotational velocity compared to the follower brace 120. In the preferred embodiment, the generator 1500 would likely be either an AC induction generator with external semiconductor rectification and velocity-controlled switching or else a DC generator. This auxiliary DC power generated could then be applied to either a separately excited field winding of the main generator or additively coupled to the output of the main generator through means of switch mode circuitry such as coupling in series a secondary winding of a transformer with rectifiers for voltage boosting or coupling in parallel a charge pump circuit for current boosting. Circuit block 1503 and leads 1504, 1505 would likely occupy a space within the generator housing 206 in the case of providing current to a separately excited field winding of the main generator, or else the same location as the power conditioning circuitry employed in the above applications. An alternate purpose for this electromechanical assembly exists in case over a long period of use the screen-covered intake 103 gets covered with tenacious debris such as seaweed, the turbine may change orientation such that the face is no longer orthogonal to the streamlines of the motive fluid thereby allowing the motive fluid to wash the debris from the screen-covered intake 103, simply by reversing the current on leads 1501, 1502 of the DC machine such that it then operates as a motor, or to switch-in an AC voltage of amplitude and frequency such that the AC induction machine then operates as a motor to affect this change in orientation.

FIG. 16 illustrates the overall control of all the components described thus far of the complete gimbal-mounted turbine for adaptively extracting energy from a free flowing motive fluid that continuously changes direction and magnitude of flow. While FIG. 16 displays a flowchart, which is ordinarily associated with a computer program running in software, the algorithm delineated may be implemented with any combination of hardware or software such as linear or analog circuits or discrete digital circuits or an integrated central processing unit, or a microprocessor. One advantage a central processing unit or microprocessor affords is convenient means to gauge, test, and communicate to a central service logging location the state of any part of the system, including functionality, or fullness of charge of batteries, or hydrogen fuel tanks, etc., using means such as well-defined existing serial protocols or wireless standards. From the start 1600, the controller is continuously sampling and storing 1601 such variables as the main generator output voltage, denoted Vo, and the output voltages from the accelerometers affixed to the buoys and from there proceeding in four concurrent paths through the flowchart. While not specifically stated in block 1601, it may be assumed all sampled variables including the signals representing the outputs of the gimbal motion sensors and/or the auxiliary generator are being sampled and stored in a likewise continuous, concurrent manner as implied by the looping arrow exiting only to return to the upper right corner of block 1601. In the preferred embodiment, this sampling period would have a time resolution necessary to react to and control mechanical processes, ordinarily sampling at approximately a frequency of about a hundred times a second, or a period of about ten milliseconds, with a small deviation allowable possibly due to the convenience of a local non-integer multiple frequency digital clock from which to derive this sampling clock frequency. These samples would then get averaged over a space of five to ten samples, this average representing a single sample in order to reduce the effects of noise. It is reasonable that no control process or adjustment would need to occur, or could efficiently occur for that matter, more often than ten to twenty times a second. Note that the four concurrent paths through the flowchart as well as some of the processes undergone in those paths are implementation specific. Obviously if certain hardware components were omitted, that would then render the associated process obsolete.

In practically all conceivable embodiments, there would always exist the path that serves to adjust the internal flow vanes 207 and runner blades 211 to optimize internal flow velocity approaching the axial fluid coupler 210 over a range of velocities of the free flowing motive fluid itself external to the turbine shroud 102. Thus in the flowchart of FIG. 16, the path proceeds from the sampling block 1601 to the decision block 1605, where the instantaneous magnitude of the sampled main generator output voltage, |Vo|, is compared to an upper threshold. This upper threshold would likely equal in excess of one hundred percent of, but less than two times, the rated voltage of the generator. Various types of circuits may perform this comparison through either digital sampling followed by numeric comparison or through analog comparators in effect triggering the DC stepper motors that actuate such adjustments through a voltage feedback loop. Hence, the outcome of this comparison in block 1605 determines whether to throttle up 1608, or throttle down 1607, the velocity of the flow through the turbine by adjusting the internal flow vanes 207 and runner blades 211 accordingly. Using means described previously and depicted algorithmically in FIG. 7, to throttle up the internal flow velocity, the controller must tighten the pitch of the runner blades 211 to a larger angle with respect to the center axis of the turbine, and to throttle down, the pitch of the runner blades 211 becomes a smaller angle, closer to parallel to the center axis, all while adjusting the angle of incidence of flow with the internal flow vanes 207 appropriately. This algorithm allows the generator to produce a maximum voltage throughout the period of usable flow.

A similar path through the flowchart exists for controlling the open or closed state of the gate. The gate in the present invention primarily functions in two states, fully open and shut, as opposed to prior art where the gate continuously controlled flow as a means of maintaining synchronous operation over varying heads and loads. In the present invention, the gate closes to inhibit flow to enable the gimbal to rotate without the mechanical constraint of gyroscopic precession, which would otherwise exist due to the angular momentum of the axial fluid coupler 210. The path through the flowchart that exits block 1601 proceeding to block 1602 portrays the control of the gate. Here the instantaneous magnitude of the voltage output from the main generator |Vo|, is differentiated over time. From block 1602, the algorithm then proceeds to the decision block 1606 to determine if the derivative with respect to time of |Vo| is practically zero. As shown in block 1606, the absolute value of the derivative is evaluated since a negative derivative merely implies the rotor is slowing, the absolute value evaluated to be lower than a threshold to account for some inaccuracy due to noise, if so, then implies a maximum or minimum in instantaneous output voltage magnitude. If the comparison finds the output voltage not at a maximum or minimum, it returns, otherwise the next step proceeds to block 1609, whereby comparing the instantaneous magnitude of the output voltage |Vo| to some threshold determines whether |Vo| is at a maximum or minimum. There it may also sense motion in the gimbal by directly observing the output of its motion sensor or indirectly by sensing the voltage generated by the auxiliary generator mechanically coupled to the associated axis of the gimbal. If the instantaneous output voltage of the main generator is below a threshold at this point, and/or motion is sensed in the gimbal, then the controller undertakes the process to close the gate 1611. The gate will remain in the closed state 1611 as long as the motion in the gimbal is sensed as depicted by decision block 1613. Upon gimbal motion ceasing, the gate opens 1615, and the algorithm returns to the start state 1600.

Another path exists based on processing the sampled instantaneous magnitude of the output voltage |Vo| to determine the extent of control processes applied in order to optimally extract energy from a free flowing motive fluid. Proceeding to block 1603, integration over an interim period is performed to determine the energy extracted during that interim. It is then averaged over the number of samples during that interim period to determine the average power during that period. The interim period would best be defined by a number of samples corresponding to a power of two. First, a number of samples, n, where n is a power of two, can be averaged simply by shifting the binary fixed-point integer sum of n samples of |Vo|, log 2(n) places to the right. Secondly, block 1614 performs calculations based on this variable and on the corresponding output of a Fast Fourier Transform, FFT, which by definition of the FFT algorithm, must be calculated over a number of samples equal to a power of two. The output variable of this averaging process 1603 is then input to update a long term average 1610 and then compared to a low threshold 1612 to determine if power is being extracted properly. If not, the controller proceeds to block 1616, where the turbine attempts to remove debris obstructing its intake by means previously described. Otherwise if the rail system or the system of accelerometers affixed to buoys is left unimplemented, the algorithm then returns to the start, otherwise it continues in an interaction with the accelerometer system to control the positioning along the rail system as subsequently described.

While the average power over an interim is being calculated, the output profiles of the accelerometers on buoys are sampled and sorted in a pattern matching algorithm to determine the location of the most recent breaking wave relative to the nearest buoy based on the foregoing discussion of output profile characteristics, while the statistics are gathered to perform a linear spatial frequency analysis to determine the sequence of locations where the waves break 1604. Whereas all previous blocks of the flowchart of FIG. 16 could have been performed without a digital processor, the complexity of the calculations performed in block 1604 likely require a digital signal processor. As an example of the linear spatial frequency analysis, much energy at a low frequency at a certain location in time and space indicates many instances of breaking waves are likely to occur in one location or gradually move in one direction, or gradually undulated over a short distance for a given time, where much energy at a high frequency would indicate a large variability in break location for a given time, and thus increased difficulty tracking and diminished returns in energy invested tracking such a sequence of locations of breaking waves. The smallest period of time the frequency domain analysis could be based on is the interim period previously described that preferably spans the minimum time required to identify an instance of a single breaking wave, thus furnishing amplitude data for that breaking wave sample. A number of these periods, or breaking wave samples, can then be accumulated such that the requirement of a power of two samples for performing a Fast Fourier Transform is satisfied, to give a time dependent distribution of location or in other words, a procession, of breaking waves. Here the concern is that the number of sampled breaking waves is great enough that an accurate Fast Fourier Transform may be computed without spanning such a period of time that the natural changes due to tides reduce the repeatability from one procession sequence to the next. While the presumption that over one hour the repeatability of the wave procession provides reasonable tracking, one hour should permit two to four unique sequences of sixty four to two hundred fifty six breaking wave samples computed within an FFT.

Depending on the outcome of decision block 1612, if power generation proves greater than a lower limit, the power extracted that correlates to optimal power, or in other words, power extracted during an interim period wherein the buoy accelerometers had identified a plunging or surging breaker occurring in close proximity before the face of the turbine, is compared 1614 to a threshold value, such as the long term power average calculated in block 1610. Theoretically, a turbine of like embodiment of the present invention, with a face area of one square meter, can extract an average of approximately three horse-power or about two and a quarter kilowatts given the aforementioned breaking conditions of a wave of one meter deep-sea height, and ten second period. If this type of wave is considered average for the place of installation, then occasions when the deep-sea wave height is doubled yield more than double the power output. Block 1614 attempts to determine such occasions that make close tracking of the procession worth the energy expended to do so. For instance, if the energy in the ocean is low that day, then the turbine should spend as little energy as necessary tracking the procession of breaking waves as depicted in block 1618, just often enough to track the tide, the procession of which could be prerecorded in non-volatile memory as a type of almanac. However, on an occasion where the return on the energy invested makes tracking the procession along the rail system worthwhile, block 1617 suggests as often as every interval, given high amplitudes and high energy in correlated low spatial frequency bins.

The previously described paths through the flowchart of FIG. 16 perform mathematical manipulations on the sampled instantaneous magnitude of the output voltage, |Vo| in order to determine an appropriate course of action. The manipulations include differentiation and integration, and it should be known that any of the paths could share the outputs of these mathematical functions in order to improve the overall control algorithm. While not explicitly depicted for sake of clarity in the flow diagram of FIG. 16, it may be inferred, and thus any deviation of the algorithm to include the additional use of these function output variables in decision blocks, or for that matter, use of a singular central processor to also concurrently perform these and other control tasks not explicitly depicted, such as, but not limited to: charging batteries; or performing electrolysis; or electronic means of motor speed control; adjusting to changes in load; or stepper displacement; or controlling an array of gimbal-mounted turbines; or logging communications; does not constitute a substantial departure beyond the scope of the present invention.

From the detailed description above it is manifest that various implementations can use the concepts of the present invention without departing from its scope. Moreover, while the invention has been described with specific reference to certain embodiments, a person of ordinary skill in the art would recognize that significant alterations could be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, omissions, and substitutions without departing from the scope of the invention.

Thus, a gimbal-mounted hydroelectric turbine for adaptively extracting energy from a free flowing motive fluid that continuously changes direction and magnitude of flow has been described.

What is claimed is:

1. A turbine or other apparatus of power generation using means responsive to motive fluid wherein the fluid intake is implemented via a gate or penstock which is:
   mechanically or electro-mechanically able to instantaneously adjust its physical orientation in any direction to adapt to changes in the direction of the streamlines of a free flowing motive fluid;
   wherein said apparatus is physically secured by a mounting system comprised of circular bearings in one axis or plural axes commonly implemented as a gimbal, to provide the ability to instantaneously adjust the physical orientation of said fluid intake in any direction, to adapt to changes in the direction of said free flowing motive fluid;
   wherein the kinetic energy contained in said motive fluid is converted to electrical potential;
   wherein said kinetic energy contained in the motive fluid is converted to electrical potential by means of a coaxial fluid coupler or impeller directly driving the rotor of a DC generator, or, directly driving or indirectly driving through a system of gears, an AC induction generator with external voltage rectifiers producing a direct current output;
   wherein the voltage output of said DC generator or said AC induction generator with external voltage rectifiers is sensed to control a gate which inhibits flow to reduce the rotational velocity of said coaxial fluid coupler or impeller thus reducing the forces of gyroscopic precession, so to quicken the response to changes in the direction of the streamlines of a free flowing motive fluid.

2. The apparatus of claim 1 wherein said gate is controlled by an electronic microprocessor sensing said voltage output of the DC generator or AC induction generator.

3. A turbine or other apparatus of power generation using means responsive to a motive fluid wherein the fluid intake is implemented via a gate or penstock which is:
   mechanically or electro-mechanically able to instantaneously adjust its physical orientation in any direction to adapt to changes in the direction of the streamlines of a free flowing motive fluid;
   wherein said apparatus is physically secured by a mounting system comprised of circular bearings in one axis or plural axes commonly implemented as a gimbal, to provide the ability to instantaneously adjust the physical orientation of said fluid intake in any direction, to adapt to changes in the direction of said free flowing motive fluid;
   wherein the kinetic energy contained in said motive fluid is converted to electrical potential;
   wherein said kinetic energy contained in the motive fluid is converted to electrical potential by means of a coaxial fluid coupler or impeller directly driving the rotor of a DC generator; or, directly driving or indirectly driving through a system of gears, an AC induction generator with external voltage rectifiers producing a direct current output;
   wherein the voltage output of said DC generator or said AC induction generator with external voltage rectifiers is sensed to control adjustable interior flow vanes and adjustable runner blades of the fluid coupler or impeller by employing a voltage feedback closed loop so as to optimize efficiency over a range of loads and flow velocities.

4. A turbine or other apparatus of power generation using means responsive to a motive fluid wherein the fluid intake is implemented via a gate or penstock which is:
   mechanically or electro-mechanically able to instantaneously adjust its physical orientation in any direction to adapt to changes in the direction of the streamlines of a free flowing motive fluid;
   wherein said apparatus is physically secured by a mounting system comprised of circular bearings in one axis or plural axes commonly implemented as a gimbal, to provide the ability to instantaneously adjust the physical orientation of said fluid intake in any direction, to adapt to changes in the direction of said free flowing motive fluid;
   wherein the kinetic energy contained in said motive fluid is converted to electrical potential;

wherein said kinetic energy contained in the motive fluid is converted to electrical potential by means of a coaxial fluid coupler or impeller directly driving the rotor of a DC generator; or, directly driving or indirectly driving through a system of gears, an AC induction generator with external voltage rectifiers producing a direct current output;

wherein the voltage output of said DC generator or said AC induction generator with external voltage rectifiers is electronically voltage and current regulated for charging any of the presently available varieties of chemistry of battery.

5. The apparatus of claim 4 wherein said charging of a battery, including gauging and communicating the fullness of the battery is controlled by an electronic microprocessor.

6. A turbine or other apparatus of power generation using means responsive to a motive fluid wherein the fluid intake is implemented via a gate or penstock which is:

mechanically or electro-mechanically able to instantaneously adjust its physical orientation in any direction to adapt to changes in the direction of the streamlines of a free flowing motive fluid;

wherein said apparatus is physically secured by a mounting system comprised of circular bearings in one axis or plural axes commonly implemented as a gimbal, to provide the ability to instantaneously adjust the physical orientation of said fluid intake in any direction, to adapt to changes in the direction of said free flowing motive fluid;

wherein the kinetic energy contained in said motive fluid is converted to electrical potential;

wherein said kinetic energy contained in the motive fluid is converted to electrical potential by means of a coaxial fluid coupler or impeller directly driving the rotor of a DC generator; or, directly driving or indirectly driving through a system of gears, an AC induction generator with external voltage rectifiers producing a direct current output;

wherein the voltage output of said DC generator is electronically voltage and current regulated for driving a DC motor mechanically coupled to a synchronous AC generator with output armature voltage applied directly to the utility power grid.

7. A turbine or other apparatus of power generation using means responsive to a motive fluid wherein the fluid intake is implemented via a gate or penstock which is:

mechanically or electro-mechanically able to instantaneously adjust its physical orientation in any direction to adapt to changes in the direction of the streamlines of a free flowing motive fluid;

wherein said apparatus is physically secured by a mounting system comprised of circular bearings in one axis or plural axes commonly implemented as a gimbal, to provide the ability to instantaneously adjust the physical orientation of said fluid intake in any direction, to adapt to changes in the direction of said free flowing motive fluid;

wherein the kinetic energy contained in said motive fluid is converted to electrical potential;

wherein said kinetic energy contained in the motive fluid is converted to electrical potential by means of a coaxial fluid coupler or impeller directly driving the rotor of a DC generator, or, directly driving or indirectly driving through a system of gears, an AC induction generator with external voltage rectifiers producing a direct current output;

wherein further energy may be extracted by implementing an auxiliary DC generator or AC induction generator with external voltage rectifiers indirectly coupled through a system of gears to one axis or plural axes of said gimbal.

8. The apparatus of claim 7 wherein the armature current of said auxiliary DC generator or AC induction generator with external voltage rectifiers may be reversed temporarily once over a long term period so as: to use the secondary generator as a motor to affect the orientation of the face area of said fluid intake such that it no longer is orthogonal to the direction of the streamlines; thus:

causing the motive fluid to remove tenacious debris from the face of the intake during a routine self-maintenance period.

9. The apparatus of claim 8 wherein said intake physical orientation is controlled by an electronic microprocessor.

* * * * *